US008660948B2

(12) United States Patent
Dessert et al.

(10) Patent No.: US 8,660,948 B2
(45) Date of Patent: Feb. 25, 2014

(54) SYSTEM AND METHOD FOR MANAGING TRANSACTIONS WITH A PORTABLE COMPUTING DEVICE

(75) Inventors: Robert Dessert, Atlanta, GA (US); Robert Canterbury, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 12 days.

(21) Appl. No.: 13/004,686

(22) Filed: Jan. 11, 2011

(65) Prior Publication Data

US 2012/0005076 A1    Jan. 5, 2012

Related U.S. Application Data

(60) Provisional application No. 61/361,105, filed on Jul. 2, 2010.

(51) Int. Cl.
*G06Q 40/00* (2012.01)

(52) U.S. Cl.
USPC ........................................... 705/40; 705/26.1

(58) Field of Classification Search
USPC ............. 705/14.64, 14.65, 39, 40, 35, 44, 30, 705/26.1, 41.44; 235/380
See application file for complete search history.

(56) References Cited

U.S. PATENT DOCUMENTS

| 5,724,424 | A  | * | 3/1998  | Gifford ........................... 705/79 |
| 6,061,665 | A  | * | 5/2000  | Bahreman ........................ 705/40 |
| 6,195,649 | B1 | * | 2/2001  | Gifford ........................... 705/75 |
| 6,584,309 | B1 |   | 6/2003  | Whigham |
| 6,915,279 | B2 | * | 7/2005  | Hogan et al. .................... 705/64 |
| 7,010,507 | B1 | * | 3/2006  | Anderson et al. ............... 705/31 |
| 7,031,693 | B2 |   | 4/2006  | Ohrstrom et al. |
| 7,072,862 | B1 | * | 7/2006  | Wilson ............................. 705/31 |
| 7,127,425 | B1 | * | 10/2006 | Wilson ............................. 705/38 |
| 7,177,829 | B1 | * | 2/2007  | Wilson et al. ................... 705/31 |

(Continued)

FOREIGN PATENT DOCUMENTS

| WO | 9638798 A1 | 12/1996 |
| WO | WO2008103880 A2 | 8/2008 |

OTHER PUBLICATIONS

Anonymous "In a Cellular World, POS Terminals Cut Their Traditional Phone Lines ( Wireless point-of-sale terminals are becoming more popular for mobile merchants )" Mar. 16, 1998 Debit Card News , v 3 , n 18 , p. 1+.*

(Continued)

*Primary Examiner* — Kelly Campen
(74) *Attorney, Agent, or Firm* — Nicholas A. Cole

(57) ABSTRACT

A method and system include verifying credentials for gaining access to a transactional controller with the portable computing device. The transactional controller may receive a merchant identifier corresponding to a merchant and then it may compare the merchant identifier against loyalty account data stored in a database. The transactional controller may also receive product scan data and compare the product scan data against one of offer data and coupon data in a database. After these comparisons, any matches of product scan data to offer data or coupon data may be sent to the PCD and the POS controller. Similarly, any matches of the merchant identifier to loyalty account data may be transmitted to the POS controller. During or after the purchase transaction, a message may be generated by the transaction controller which lists one or more preferred payment options that may be selected using the PCD to complete a purchase.

40 Claims, 18 Drawing Sheets

(56) References Cited

U.S. PATENT DOCUMENTS

| | | | |
|---|---|---|---|
| 7,318,049 | B2 | 1/2008 | Iannacci |
| 7,575,177 | B2* | 8/2009 | Killian et al. ............... 235/492 |
| 7,630,937 | B1 | 12/2009 | Mo et al. |
| 7,873,573 | B2 | 1/2011 | Realini |
| 7,988,060 | B2* | 8/2011 | Killian et al. ............... 235/492 |
| 7,991,694 | B2* | 8/2011 | Takayama ................... 705/41 |
| 8,151,345 | B1* | 4/2012 | Yeager ........................ 726/20 |
| 2004/0078328 | A1 | 4/2004 | Talbert et al. |
| 2006/0178986 | A1 | 8/2006 | Giordano et al. |
| 2006/0224470 | A1* | 10/2006 | Ruano et al. ............... 705/27 |
| 2007/0050277 | A1* | 3/2007 | Wilson ....................... 705/35 |
| 2007/0055635 | A1* | 3/2007 | Kanapur et al. ............ 705/75 |
| 2007/0136160 | A1* | 6/2007 | Wilson et al. .............. 705/31 |
| 2008/0140420 | A1* | 6/2008 | Lee ............................. 704/273 |
| 2008/0208762 | A1* | 8/2008 | Arthur et al. ............... 705/79 |
| 2008/0228567 | A1 | 9/2008 | Williams et al. |
| 2009/0018961 | A1 | 1/2009 | Seven et al. |
| 2009/0072020 | A1 | 3/2009 | Hull |
| 2009/0090783 | A1* | 4/2009 | Killian et al. ............... 235/492 |
| 2009/0094123 | A1* | 4/2009 | Killian et al. ............... 705/16 |
| 2009/0094125 | A1* | 4/2009 | Killian et al. ............... 705/17 |
| 2009/0094126 | A1* | 4/2009 | Killian et al. ............... 705/17 |
| 2009/0125429 | A1* | 5/2009 | Takayama ................... 705/35 |
| 2009/0240626 | A1 | 9/2009 | Hasson et al. |
| 2009/0266884 | A1* | 10/2009 | Killian et al. ............... 235/380 |
| 2009/0288012 | A1 | 11/2009 | Hertel et al. |
| 2010/0082444 | A1 | 4/2010 | Lin et al. |
| 2010/0114731 | A1 | 5/2010 | Kingston et al. |
| 2010/0131342 | A1 | 5/2010 | Thibedeau et al. |
| 2010/0250351 | A1* | 9/2010 | Gillenson et al. .......... 705/14.13 |
| 2010/0250356 | A1* | 9/2010 | Gillenson et al. .......... 705/14.18 |
| 2010/0299195 | A1 | 11/2010 | Nix et al. |
| 2011/0011931 | A1 | 1/2011 | Farley et al. |
| 2011/0117966 | A1 | 5/2011 | Coppinger |
| 2011/0251892 | A1 | 10/2011 | Laracey |
| 2012/0160912 | A1 | 6/2012 | Laracey |
| 2012/0296725 | A1 | 11/2012 | Dessert et al. |
| 2012/0296726 | A1 | 11/2012 | Dessert et al. |
| 2013/0211900 | A1 | 8/2013 | Dessert |

OTHER PUBLICATIONS

Anonymous "First Data to Deliver Mobile Payments with Tyfone's MicroSD-Based Contactless Technology.(Company overview)" Mar. 16, 2010 Business Wire, NA.*

Digital Transactions, Trends in the Electronic Exchange of Value, "Out of Stealth, MobilePay USA Promises to Crack the POS" Oct. 8, 2010. <http://www.digitaltransactions.net/newsstory.cfm?newsid=2661>.

USA Today, Techcrunch; Oct. 6, 2010 Mobile Marketing Watch, "MobilePayUSA May be More Lucrative for Businesses." <http://content.usatoday.com/topics/article/Techcrunch/04nec8sgwc6yO/1>.

Spoonauer, Mark. Laptop, The Pulse of Mobile Tech, "5 Trends to Watch at CTIA Fall 2010", Oct. 5, 2010. <http://blog.laptopmag.com/5-trends-to-watch-at-ctia-fall-2010>.

TechCrunchTV, Disrupt. "Startup Battlefield Day 2: MobilePay USA's Pitch," 2011. <http://techcrunch.tv/disrupt/watch?id=E2aXFxMTpHbzq5cQU5ZrcM57d2mT-obA>.

Hatchman, Mark. pcmag.com, "MobilePay: Your Phone Is Your Credit Card," Sep. 28, 2010. <http://www.pcmag.com/article2/9,2827,2369877,00.asp>.

Marin. Intomobile, "MobilePay USA wants your phone to be your wallet [update]," Sep. 29, 2010. <http://www.intomobile.com/2010/09/29/mobilepay-mobile-payment-video/>.

Spoonauer, Mark. Laptop, The Pulse of Mobile Tech, "MobilePay USA App Promises to Replace Your Wallet", Sep. 29, 2010. <http://blog.laptopmag.com/mobilepay-usa-app-promises-to-replace-your-wallet>.

International Search Report and Written Opinion—PCT/US2011/030980—ISA/EPO—May 30, 2011.

digimo.b1z, Digimo Mobile Payment—The only free mobile payment, http://digimo.biz/about-us/the-digimo-revolution/,two pages, accessed Mar. 8, 2012.

Sarah Clark, Israeli bank to launch combined NFC and mobile barcode payments system, NFC World Article, Oct. 15, 2010, three pages, http://www.nfcworld.com/2010/10/15/34696/israel-bank-launch-nfc-mobile-barcode-payments/ accessed Mar. 8, 2012.

seamless.se, GoBanking Product Brochure (PDF) four pages, http://www.seamless.se/"q=e_top_up, accessed Mar. 8, 2012.

seamless.se, GoHandset Product Brochure (PDF) four pages, http://www.seamless.se/"q=e_top_up, accessed Mar. 8, 2012.

seamless.se, GoShopping Product Brochure (PDF) four pages, http://www.seamless.se/"q=e_top_up, accessed Mar. 8, 2012.

seamless.se, Mollet Product Brochure (PDF), four pages, http://www.seamless.se/"q=mobile_money, accessed Mar. 8, 2012.

seamless.se, Mollet Product Uses Brochure (PDF), four pages, http://www.seamless.se/"q=mobile_money, accessed Mar. 8, 2012.

seamless.se, Seamless.se home page and product offering pages, seven pages, http://www.seamless.se/"q=home, accessed Mar. 8, 2012.

seamless.se, SEQR Product video Excerpts. Youtube video, four pages, http://www.seamless.se/seqr/index.html, accessed Mar. 8, 2012.

seamless.se, The VAS suite Product Brochure (PDF). four pages, http://www.seamless.se/"q=vas, accessed Mar. 8, 2012.

* cited by examiner

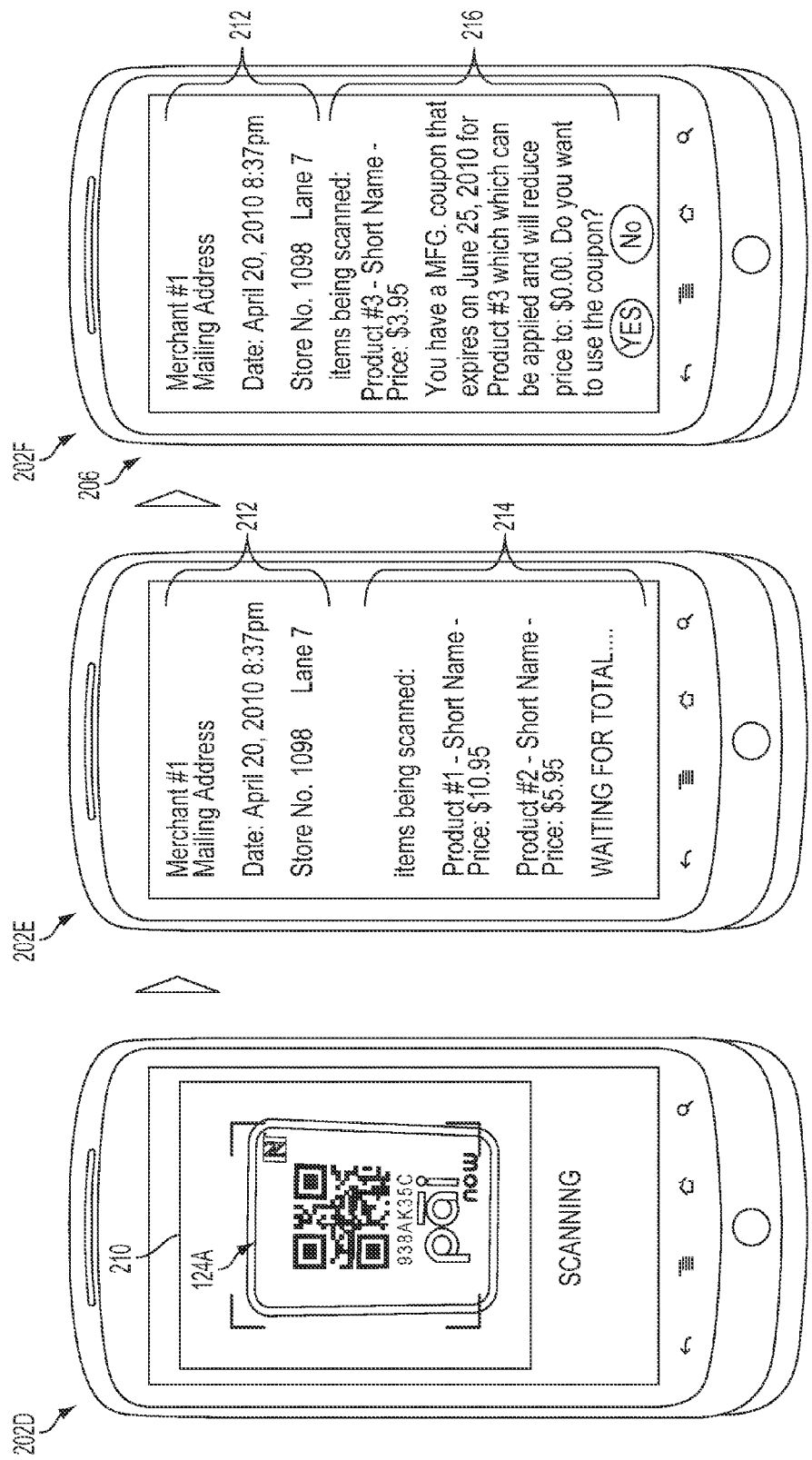

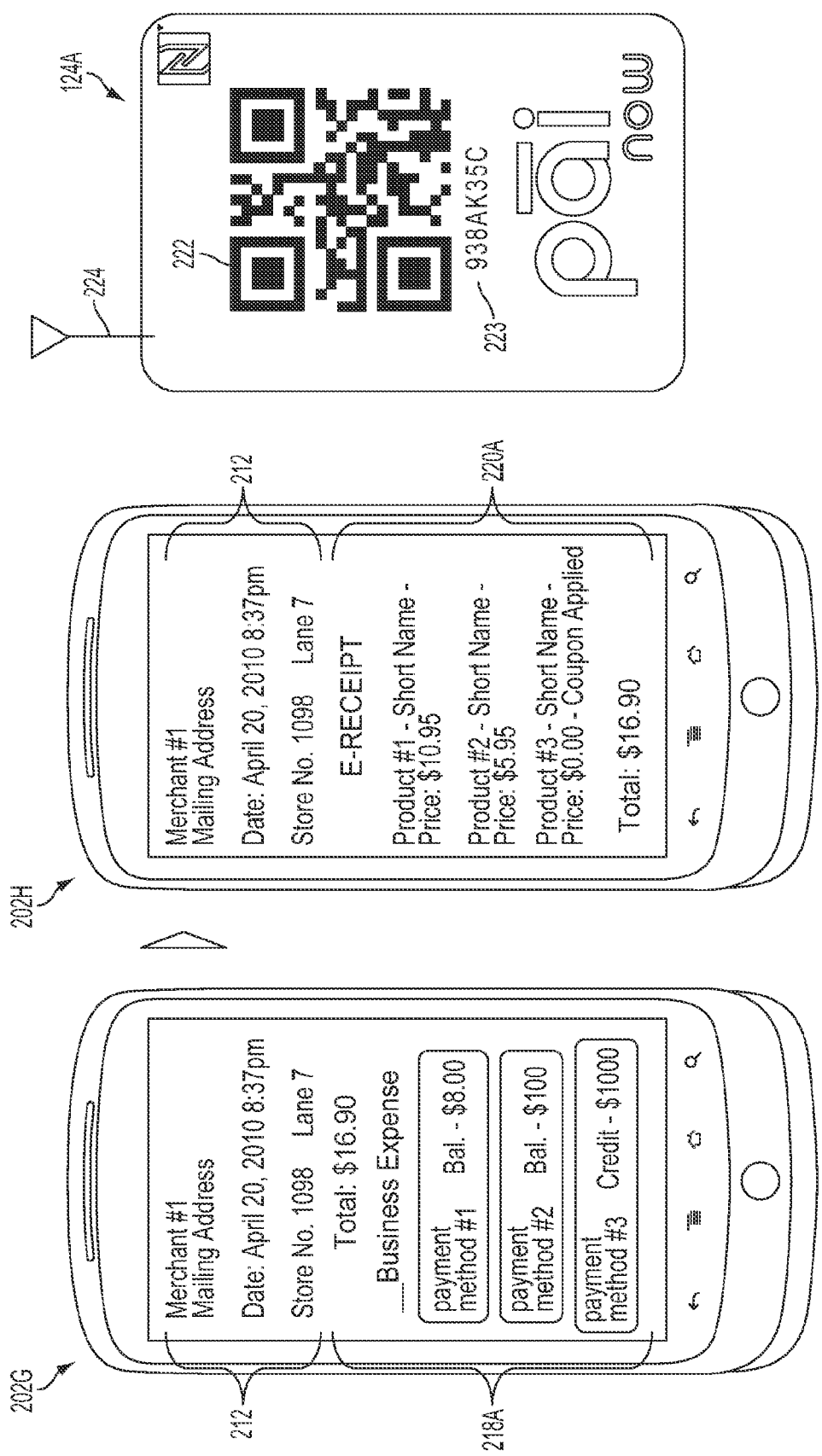

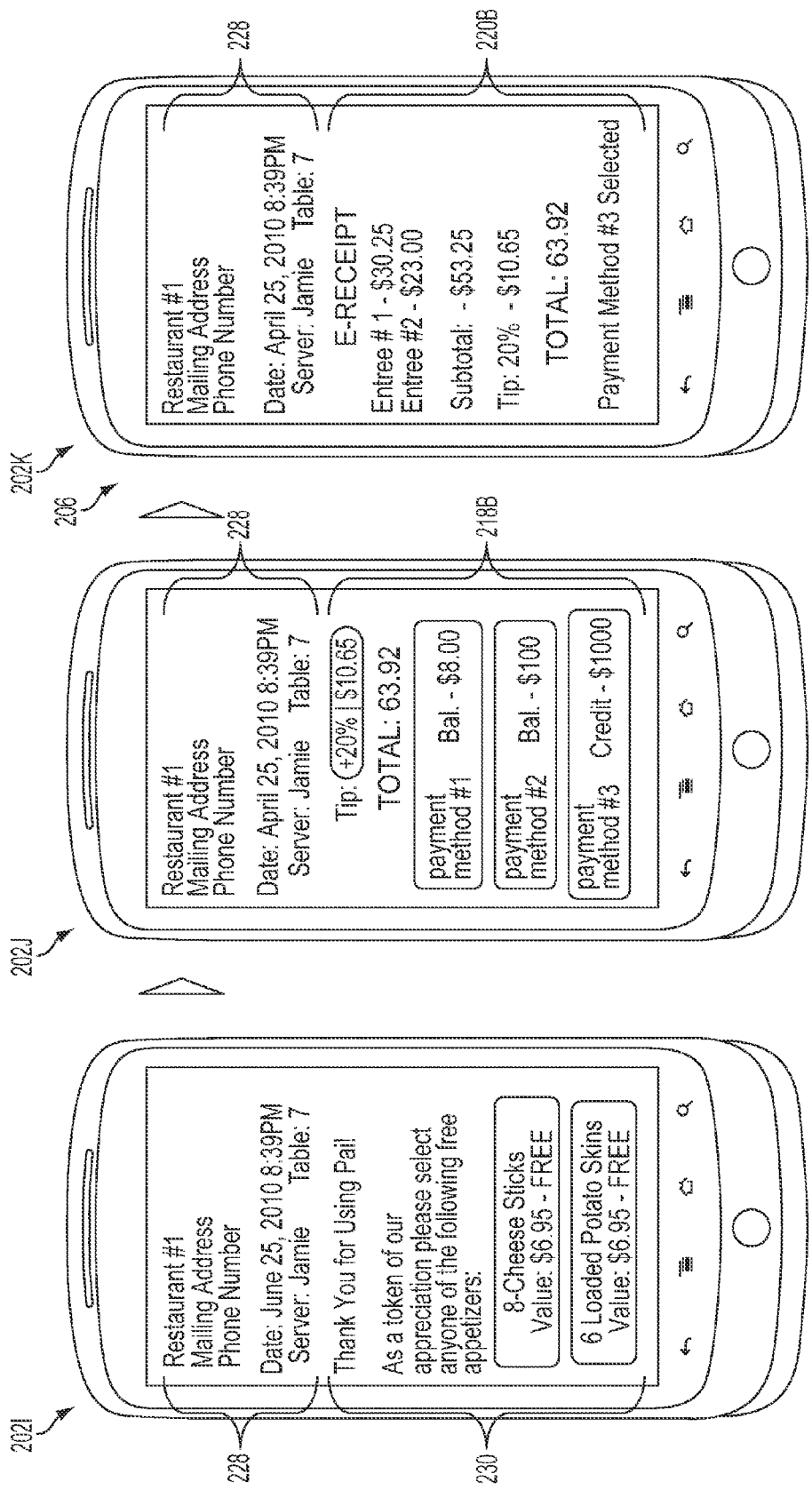

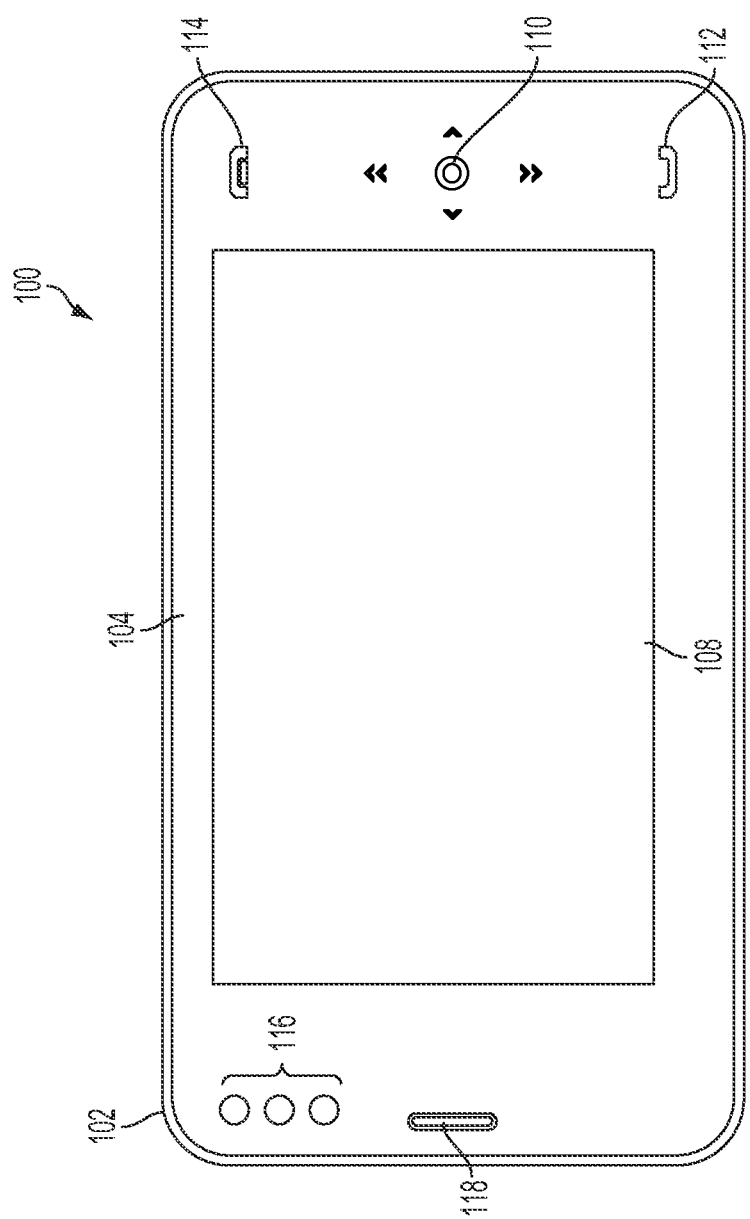

SYSTEM AND METHOD FOR MANAGING TRANSACTIONS WITH A PORTABLE COMPUTING DEVICE

DESCRIPTION OF THE RELATED ART

Portable computing devices (PCDs) are becoming necessities for people on personal and professional levels. These devices may include cellular telephones, portable digital assistants (PDAs), portable game consoles, palmtop computers, and other portable electronic devices.

PCDs are often utilized to conduct financial transactions. For example, PCDs may be used to check bank account balances, transfer funds between bank accounts, and for paying bills. While PCDs are useful for these types of transactions, there is a growing need in the art for utilizing PCDs in other types of transactions.

For example, an ordinary consumer may be assigned a loyalty card which corresponds to a first merchant. The consumer may also own a gift card that also corresponds to this first merchant. The consumer may also be assigned a credit or debit card affiliated with the first merchant which provides the consumer with additional benefits should the credit card be used to make purchases with a first merchant. Further, the first merchant may also accept coupons for products that are sold by the merchant and that may be collected by the consumer.

When the consumer decides to purchase products from the first merchant, the consumer will usually want all the benefits and discounts that are available to the consumer for any given transaction. The problem of the consumer bearing all the responsibility to track these benefits and discounts may grow exponentially when the consumer has similar loyalty cards, credit cards, and coupons for a plurality of other second merchants.

The scenario reaches its apex of complexity when the consumer is standing in a checkout line and in front of a point-of-sale terminal owned by the first merchant and ready to make a purchase of one or more products. The consumer will need to provide the first merchant with any relevant loyalty cards and any relevant coupons or rewards in which the consumer is entitled. When the consumer is ready to pay for the products, he or she may need to present any relevant gift cards as well as any relevant credit or debit cards should the gift cards not cover the total amount due for the purchase of the products.

Accordingly, what is needed is a system and method that may overcome the problems associated with tracking a plurality of benefits and payment methods which are available to a consumer for purchasing goods or services (or both).

SUMMARY OF THE DISCLOSURE

A method and system for managing transactions with a portable computing device (PCD) are described. The method may include verifying credentials for gaining access to a transactional controller with the portable computing device. The method further includes the transactional controller receiving a merchant identifier corresponding to a merchant from a computer communications network and then comparing the merchant identifier against loyalty account data stored in a database. The method may further include the transaction identifier receiving product scan data and comparing the product scan data against one of offer data and coupon data in a database. After these comparisons, any matches of product scan data to offer data or coupon data may be sent over the computer communications network to the PCD and the POS controller. Similarly, any matches of the merchant identifier to loyalty account data may be transmitted over the computer communications network to a POS controller. In parallel with the matching described above, line-item product scan data may be transmitted over the computer communications network from the POS controller to the PCD. At some point during or after the purchase transaction, a message may be generated by the transaction controller which lists one or more preferred payment options that may be used and selected by the user from the PCD to complete a purchase.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

FIG. 2D is a diagram of a screen that shows the contents of an image being scanned with a camera of the PCD;

FIG. 2E is a diagram of a screen that shows merchant information relevant to a transaction and a line item listing of products being scanned by a product scanner coupled to an electronic cash register;

FIG. 2F is a diagram of a screen that shows merchant information relevant to a transaction and a coupon option that may be selected by a user;

FIG. 2G is a diagram of a screen that shows merchant information relevant to a transaction and a total bill for a purchase along with a plurality of payment options that may be selected by user;

FIG. 2H is a diagram of a screen that shows an electronic receipt that may be provided upon completion of a transaction with a merchant;

FIG. 2I is a diagram of an exemplary machine-readable tag that may be coupled to an electronic cash register of a merchant;

FIG. 3C is a diagram of a screen that shows relevant merchant information and an option for an offer from a merchant that may be selected by a user prior to the end of a transaction;

FIG. 3D is a diagram that shows merchant information relevant to a transaction and a total bill for a purchase along with a plurality of payment options that may be selected by user;

FIG. 3E is a diagram of a screen that shows electronic receipt that may be provided upon completion of a transaction with a merchant, such as a restaurant;

FIG. 4A is a front plan view of a first aspect of a portable computing device (PCD) in a closed position;

DETAILED DESCRIPTION

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "communication device," "wireless device," "wireless telephone," "wireless communication device," and "wireless handset" are used interchangeably. With the advent of third generation ("3G") wireless technology, greater bandwidth availability has enabled more portable computing devices with a greater variety of wireless capabilities. Therefore, a portable computing device may include a cellular telephone, a pager, a PDA, a smartphone, a navigation device, or a hand-held computer with a wireless connection or link.

Figure 1:
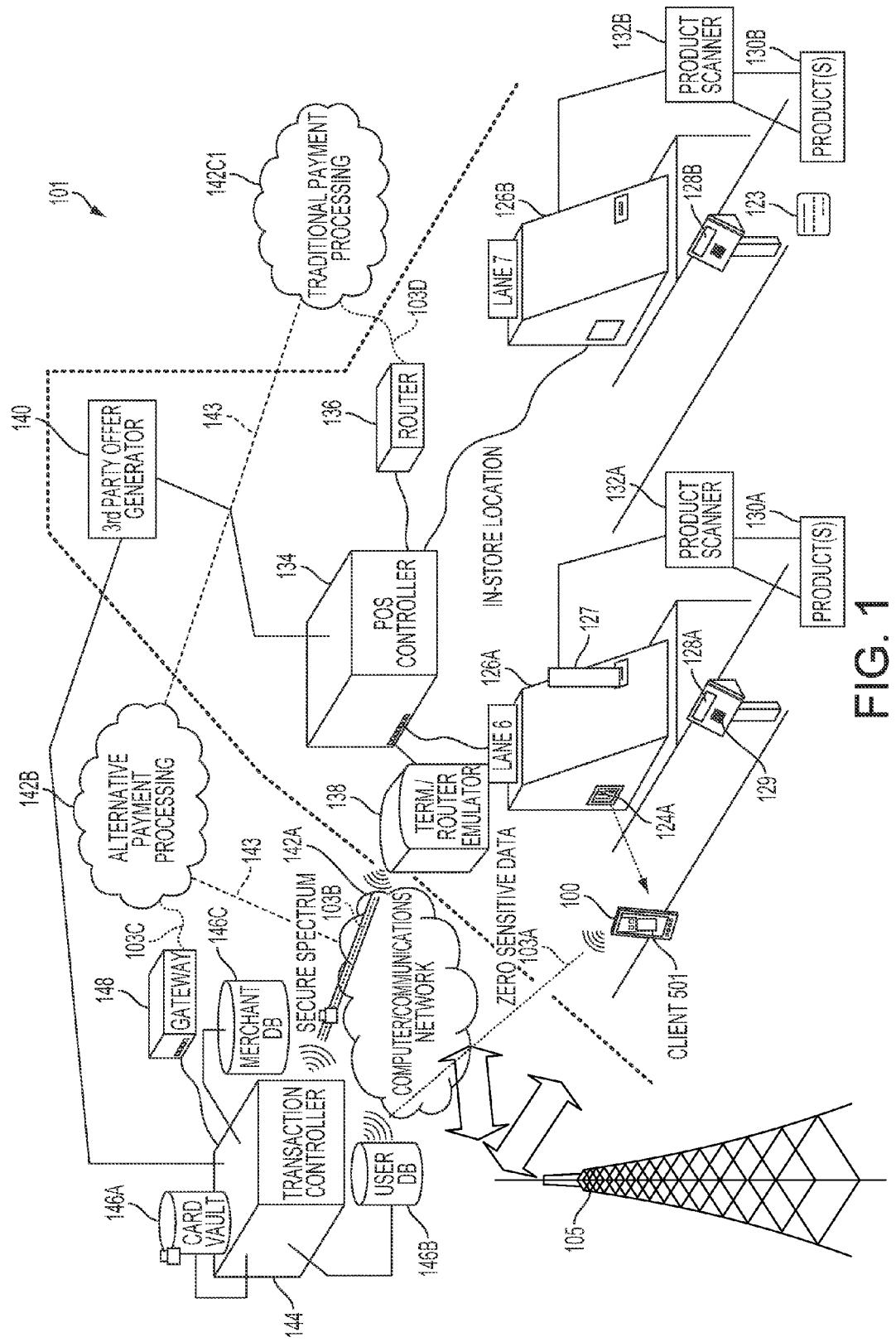
FIG. 1 is a diagram of a wireless portable computing device (PCD) coupled to a wireless communications network which are integral parts of a system for managing transactions with the portable computing device.

Referring initially to FIG. 1, this figure is a diagram of a wireless portable computing device (PCD) 100 coupled to a wireless communications network 142A via a communication link 103A which are integral parts of a system 101 for managing transactions with the portable computing device 100. Many of the system elements illustrated in FIG. 1 are coupled via communications links 103 to the communications network 142A. The links 103 illustrated in FIG. 1 may comprise wired or wireless links. Wireless links include, but are not limited to, radio-frequency ("RF") links, infrared links, acoustic links, and other wireless mediums. The communications network 142A may comprise a wide area network ("WAN"), a local area network ("LAN"), the Internet, a Public Switched Telephony Network ("PSTN"), a paging network, or a combination thereof. The communications network 142A may be established by broadcast RF transceiver towers 105. However, one of ordinary skill in the art recognizes that other types of communication devices besides broadcast RF transceiver towers 105 are included within the scope of the invention for establishing the communications network 142A. The PCD 100 is shown to have an antenna 372 (see FIG. 4C) so that a respective PCD 100 may establish wireless communication links 103A with the communications network 142A via RF transceiver towers 105.

The portable computing device (PCD) 100 may support a client transaction manager module 501 that may reside in memory 404A (See FIG. 4C) of the PCD 100. The client transaction manager module 501 may allow the PCD 102 communicate with the transaction controller 144 over the computer/communications network 142A. The client transaction manager module 501 may also allow the PCD 100 to collect information from a machine-readable tag 124A that is coupled to an electronic cash register 126A. The machine-readable tag 124A may comprise a unique merchant identifier and a unique terminal identifier that help the PCD 100 to manage point-of-sale (POS) transactions. Further details about the machine-readable tag 124A will be described below in connection with FIG. 2I.

The electronic cash register (ECR) 126A may comprise a mechanical or electronic device or combination thereof for calculating and recording sales transactions. The ECR 126A may also comprise a drawer for storing cash currency. The ECR 126A may also print a receipt 127 for a customer with a printing device (not illustrated).

The ECR 126A may be coupled to a product scanner 132A which may be used to scan other machine-readable labels attached to one or more products 130A. The product scanner 132A may comprise a bar code reader or any type of similar device used to collect information from machine-readable labels attached to a product 130A.

The ECR 126A may also be coupled to a point-of-sale (POS) terminal 128A. The POS terminal 128A may comprise a device for reading any one of a number of tokens 123 such as credit cards, debit cards, loyalty cards, stored value cards such as gift cards, and the like. The POS terminal 128A may comprise a device that reads magnetic stripes on cards, integrated circuit cards, and near-field-communication (NFC)

cards as understood by one of ordinary skill in the art. The POS terminal 128 may also comprise a keypad 129 so that a consumer may enter appropriate information relative to any token 123 that may be scanned or read by the POS terminal 128A.

The ECR 126A is also coupled a point-of-sale (POS) controller 134. The POS controller 134 may support one or more electronic cash registers (ECRs) 126A, 126B for a particular location of a merchant. The POS controller 134, as understood by one of ordinary skill in the art, may comprise a computer server for tracking and matching scanned product codes with a product inventory database (not illustrated separately) which is maintained by the POS controller 134.

The POS controller 134 may receive product data that is produced by the product scanner 132A and which is relayed by the ECR 126A. The POS controller 134 may be responsible for securing authorization for payment from a consumer after a token 123 is read by the POS terminal 128B. The POS controller 134 may support one or more product specific languages as understood by one of ordinary skill the art such as, but not limited to, unified POS and JAVA™ POS.

To secure authorization for payment, such as for a credit or debit card, the POS controller 134 communicates with a router 136. A router 136 may comprise a device that interconnects two or more computer networks, and selectively interchanges packets of data between them, as is understood by one of ordinary skill in the art. The router 136 of FIG. 1 couples the POS controller 134 to another computer communications network 142C1 for traditional payment processing. This third computer communications network 142C1 may be part of or the same as the first computer communications network 142A as described above. The dashed line 143 indicates that the first computer communications network 142A, and the second computer communications network 142B, and the third computer communications network 142C1 may all be part of the same network 142 or they may be separate, distinct computer networks as understood by one of ordinary skill in the art.

The third computer communications network 142C1 may be responsible for traditional payment processing. Traditional payment processing may include, but is not limited to, processing payments from accounts associated with traditional credit cards and debit cards. The third computer communications network 142C1 may comprise exemplary networks such as the VISA™ credit card network, the MASTERCARD™ card network, the DISCOVER™ credit card network, the AMERICAN EXPRESS™ credit card network, and other similar charge or debit card proprietary networks.

Meanwhile, the second computer communications network 142B may be responsible for handling and managing non-traditional or alternative payment processing. For example, alternative payment processing may include, but is not limited to, processing payments from accounts associated with certain online financial institutions or other service providers, like PAYPAL™, BILL ME LATER™, Wii™, APPLE™, GREEN DOT™, and mobile phone carriers like SPRINT™ and VERIZON™.

The POS controller 134 may also be coupled to a third party offer generator 140 that produces targeted coupons based upon specific products purchased by a consumer. The third party offer generator 140 may comprise a device currently sold by Catalina Marketing, Inc. for producing targeted coupons for a consumer. Other types of third-party offer generators 140 are within the scope of the invention. In the alternative, the offer generator 140 may comprise an internal system component managed and supported by the operator of the transactional controller 144.

The POS controller 134 is also coupled to a terminal/router (T/R) emulator 138 which links the POS controller 134 with the transaction controller 144. The T/R emulator 138 functions as a router 136 when an alternative payment option 142B is selected by the consumer on the PCD 100, since most brick and mortar type merchants and corresponding POS controllers 134 as of this writing do not directly support payments from on-line financial institutions like PAYPAY™ and BILL ME LATER™. In other words, when the PCD 100 receives an alternative payment processing selection from a consumer, the PCD 100 communicates with the transaction controller 144 which in turn communicates with the T/R emulator 138. The emulator 138 sends a message to the POS controller 134 to indicate that the emulator 138 is operating as a payment router and that the POS controller 134 should be ready to receive a payment authorization from an alternative payment vendor 142B.

The T/R emulator 138 functions as an electronic cash register (ECR) 126 when the emulator 138 relays product scan data to the transaction controller 144 which then also relays this product scan data to the PCD 100 displayed to a user. The emulator 138 may send a message to the POS controller 134 that the emulator 138 is functioning as an ECR 126 and the emulator 138 may request product scan data that is being generated and received by actual ECRs 126.

The T/R emulator 138 also functions as a POS terminal 128 when the transaction controller 144 relays payment account information, such as credit card data, that is routed through the POS controller 134, a router 136, and on to a traditional payment network or computer communications network 142C1. In other words, the T/R emulator 138 functions as a POS terminal 128 when a form of payment managed and stored in a secure vault 146A is selected by a consumer with the PCD 100. Upon selection of a form of payment stored in the secure vault 146A, the transaction controller 144 may relay appropriate payment information, such as information like that collected by a terminal 128 which reads a magnetic stripe, over a secure communication channel 103B to the T/R emulator 138 which then relays this payment information to the POS controller 134 similar to how a traditional POS terminal 128 would forward such data to the POS controller 134. The POS controller 134 would then forward this payment information over the router 136 and on to the third computer communication network 142C1 for requesting an authorization of payment.

The T/R emulator 138 may comprise off-the-shelf software or hardware (or both). According to one exemplary embodiment, the T/R emulator 138 may comprise an Exadigm SV100, a WiFi, CDMA, and IP enabled unattended payment device. The T/R emulator 138 may be designed to support secure channels with the transaction controller 144. Further details of an exemplary software architecture supported by the T/R emulator 138 is described below in connection with FIG. 5.

The transaction controller 144 may be part of a system responsible for managing and maintaining mobile wallets that are stored in memory by the PCD 100. A mobile wallet is a system that may provide information for one or more stored value accounts as well as other types of accounts, such as, but not limited to, credit card accounts and bank accounts, as understood by one of ordinary skill in the art.

The transaction controller 144 supports and may store financial transaction(s) data in storage devices 146A, 146B, 146C. The storage devices 146A, 146B, and 146C may comprise computer databases. The transaction controller 144 manages data between the PCD 100 and the terminal/router emulator 138 located within a store front that includes the POS controller 134. The transaction controller 144 is also responsible for communicating with a gateway 148 for establishing a connection with the second computer communications network 142B associated with alternative payments. The transaction controller 144 may relay product scan data sent from the terminal/router emulator 138 over the computer communications network 142A to the PCD 100 so that the PCD 100 may display products individually on the display of the PCD 100 as they are scanned in by the product scanner 132A. The transaction controller 144 may also relay payment authorizations received from the second computer communications network 142B to the terminal/router emulator 138.

The first storage device 146A coupled to the transaction controller 144 may track one or more payment accounts associated with a client of a PCD 100. For example, the first storage device 146A may comprise a secure vault that houses credit card data, stored value account data, and other sensitive payment information data. The first storage device 146A may be managed and co-located with the transaction controller 144. However, it is possible that the first storage device 146A may comprise a third party solution that is located off-site relative to the transaction controller 144. Further detail about the first storage device 146A will be described below in connection with FIG. 6.

The second storage device 146B may comprise one or more client profiles associated with a respective PCD 100. The client profiles may comprise preferences selected by a user of the PCD 100. Such preferences may include, but are not limited to, an account user name as well as preferred forms of payment corresponding to the payment accounts maintained in the secure vault or first storage device 146A. The second storage device 146B may also track benefits associated with particular merchants such as loyalty account information, coupons, and other similar offer information for a user of the PCD 100. Further details about the second storage device 146B are described below in connection with FIG. 8.

The third storage device 146C may comprise merchant data associated with various merchants who subscribe to the system and who have one or more terminal/router emulators 138 positioned in their stores for communicating with the transaction controller 144. The merchant data stored in the third storage device 146C may comprise preference data selected by a respective merchant. Further details of the third storage device 146C are described below in connection with FIG. 7.

The gateway 148 coupled to the transaction controller 144 may comprise a payment server as understood by one of ordinary skill in the art. Communications between the transaction controller 144 and the payment gateway 148 may comprise a secured socket layer (SSL) encrypted connection. Usually, the transaction controller 144 relays alternative payment account information stored in a secure vault or first storage device 146A to the payment gateway 148 over a secure channel 103C or link 103C.

The payment gateway 148 may forward the transaction information to a payment processor (not illustrated) coupled to the second computer communications network 142B used by a merchant's acquiring bank. The payment processor forwards the transaction information to one of the alternative payment providers.

The alternative payment provider may route the transaction to the correct issuing bank associated with a client's account. The issuing bank receives the authorization request and sends a response back to the payment processor (via the same process as the request for authorization) with a response code. In addition to determining the fate of the payment, (i.e. approved or declined) the response code is used to define the reason why the transaction failed (such as insufficient funds, or bank link not available). The processor forwards the response to the payment gateway 148.

The payment gateway 148 receives the response, and forwards it on to the transaction controller 144. The transaction controller 144 may interpret the response as a relevant response and then relay it back to the PCD 100 and the POS controller 134 via terminal/router emulator 138.

Exemplary High-Level Operation of System 101

An operator of the PCD 100 may desire to purchase one or more products 130A that may be scanned with a product scanner 132A. Prior to or in parallel to the operation of scanning products with the product scanner 132A, the operator of the PCD 100 may retrieve the unique terminal identifier and the merchant identifier associated with the tag 124A which is affixed to the first electronic cash register 126A. This unique terminal identifier and merchant identifier retrieved by the PCD 100 may be relayed back to the transaction controller 144. In response to receiving the terminal identifier and merchant identifier, the transaction controller 144 may send messages to the terminal/router emulator 138 so that the terminal/router emulator 138 may function as a terminal. The terminal/router emulator may request the POS controller 134 for the product scan data being generated by the product scanner 132A.

In response to this request from the terminal/router emulator 138, the POS controller 134 may forward on product scan data to the terminal/router emulator 138 which relays this information through the transaction controller 144 to the PCD 100 so that the product scan data may be displayed on the display device of the PCD 100. The PCD 100 may provide an option that may be selected by a user to turn off this product scan data from being displayed on the display device of the PCD 100 while the products 130A are being scanned.

While the products 130A are being scanned by the product scanner 132A, the transaction controller 144 may also retrieve loyalty account information from a profile associated with a user of the PCD 100 which is stored in the second storage device 146B. The transaction controller 144 may relay this loyalty account information to the POS controller 134 via the terminal/router emulator 138.

When the product scanner 132A is finished scanning the products 130A for purchase, the electronic cash register 126A may generate a final total of money due for payment in connection with the purchase of the products 130A. This final total data is relayed through the POS controller 134 and terminal/router emulator 138 to the transaction controller 144 which in turn relays this information to the PCD 100. In addition to relaying this final total data to the PCD 100, the transaction controller 144 may also retrieve payment accounts available to the user and that may have been selected by a user in a predetermined order for display on the PCD 100. At this time, or any time during the transaction cycle, an operator of the PCD 100 may select from one of a plurality of payment methods supported by the transaction controller 144. Alternatively, an operator of the PCD 100 may select a plurality of payment methods in order to pay the final total due in connection with the purchased products 130A. Once a payment method or a combination of methods are selected by an operator of the PCD 100, the PCD 100 relays this selection to the transaction controller 144.

Depending upon the form of payment selected, the transaction controller 144 selects data from the first storage device or secure vault 146A for rendering payment associated with the final total data. If an alternative form of payment is selected by the operator of the PCD 100, then the transaction controller 144 will relay the alternative payment account information through the gateway 148 to the second computer communications network 142B for alternative payment processing as described above.

If a traditional form of payment is selected by the operator of the PCD 100, such as the selection of a credit card account, then the transaction controller 144 may relay this credit card payment information over a secure channel 103B to the terminal/router emulator 138 which then communicates this information to the POS controller 134. The POS controller 134 then relays this credit card payment information to its router 136 which then sends the credit card information to the third computer communications network 142C1. As noted previously, the third computer communications network 142C1 may comprise exemplary networks such as the VISA™ credit card network, the MASTERCARD™ card network, the DISCOVER™ credit card network, the AMERICAN EXPRESS™ credit card network, and other similar charge card proprietary networks. One of ordinary skill in the art recognizes that transactions for merchant gift cards may also follow the same flow with the router 136 directing the transaction to the merchant's stored value processor that may be part of the third computer communications network 142C1.

If payment was made using the third computer communications network 142C1 and if the transaction was approved, then the router 136 relays this approval message to the POS controller 134 which then relays the approval message to the electronic cash register 126A and to the terminal/router emulator 138. The terminal/router emulator 138 forwards the approval message to the transactional controller 144 which then relays the approval message to the PCD 100 for display on the display device of the PCD 100.

Similarly, if payment was made using the second computer communications network 142B and if the transaction was approved, then the gateway 148 relays this approval message to the transaction controller 144 which then relays the payment approval message to the PCD 100 for display on the display device of the PCD 100. The transaction controller 144 also relays the payment approval message to the terminal/router emulator 138 which then forwards the payment approval message to the POS controller 134 which in turn relays the information to the electronic cash register 126A. The transaction controller 144 may generate an electronic receipt that can be forwarded and displayed on a display device of the PCD 100. Meanwhile, the electronic cash register 126A may also generate a hard copy receipt 127.

Figure 2C:
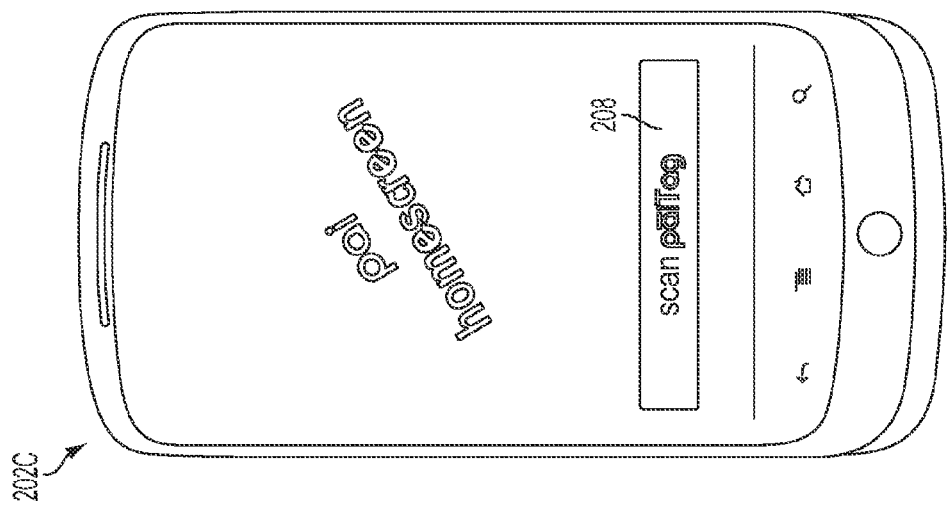
FIG. 2C is a diagram of a screen for the PCD confirming access to system.
Figure 2B:
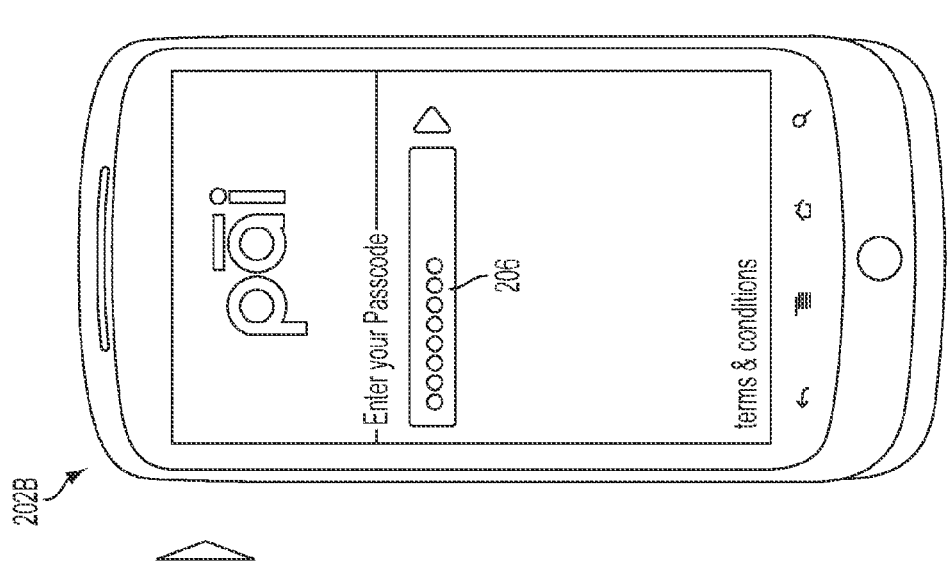
FIG. 2B is a diagram of a screen for entering additional log-in credentials such as a password on the PCD to access the system.
Figure 2A:
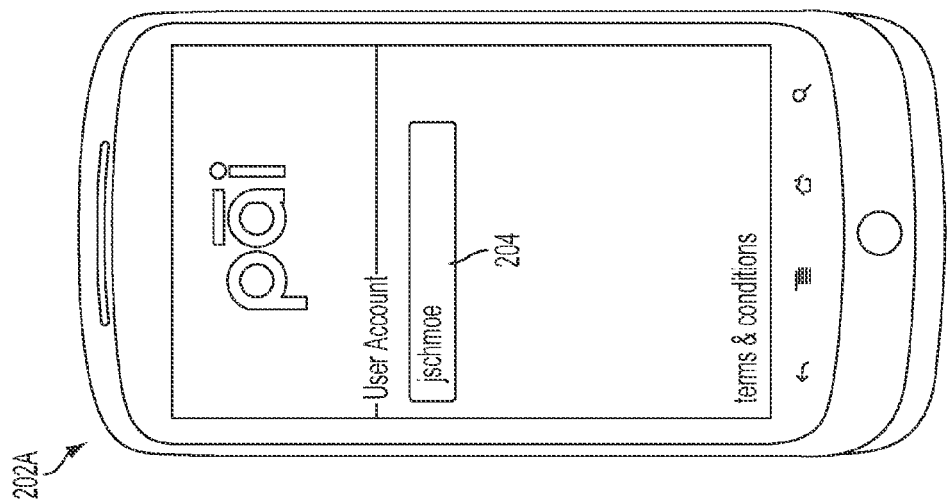
FIG. 2A is a diagram of a screen for entering a user's log-in credentials on the PCD to access the system.

FIG. 2A is a diagram of a screen 202A of the PCD 100 for entering a user's log-in credentials 204 on the PCD 100 to access the system 101. The user's log-in credentials 204 may comprise a unique user name selected by an operator of the PCD 100. When the user name is entered by the operator of the PCD 100, the transaction controller 144 may verify that the user name entered and a unique identifier assigned to the PCD 100 match by checking client profiles which may be stored in the second storage device 146B. One of ordinary skill in the art recognizes that authentication of the operator of the PCD 100 at this stage may include other security measures beyond just a user name/password. Other security measures which may be used as alternatives or as supplemental security measures to those already described include, but are not limited to, biometrics, secure elements such as integrated-circuit (IC) cards or smart cards, and other like methods in the art of multi-factor authentication.

If the user name and unique identifier assigned to the PCD 100 do not match, then the transaction controller 144 may deny entry to the system 101 and prompt the user for correct credentials for a predetermined number of times. If the user name and unique identifier assigned to the PCD 100 do match, then the transaction controller 144 may prompt the operator of the PCD 100 for the password 206 associated with the user name on the account such as illustrated in FIG. 2B.

FIG. 2B is a diagram of a screen 202B for entering additional log-in credentials such as a password 206 on the PCD 100 to access the system 101. If the correct password 206 is not entered by an operator of the PCD 100 after a predetermined number of times, the transaction controller 144 may lock out the account associated with the user name that was entered in the first screen 202A of FIG. 2A. If the correct password 206 is entered by an operator of the PCD 100, then the transaction controller 144 may generate a welcome screen 202C such as illustrated in FIG. 2C.

FIG. 2C is a diagram of a screen 202C for the PCD 100 confirming access to system 100. The welcome screen 202C may also comprise an execution button 208 that may activate the transaction software 501 residing in and supported by the PCD 100. Upon selecting the execution button 208, the PCD 100 may launch the local transaction software 501 running on the PCD 100 which causes the PCD 100 to generate the next screen 202D as illustrated in FIG. 2D.

FIG. 2D is a diagram of a screen 202D that shows the contents of an image 210 being scanned with a camera 348 of the PCD 100. The image 210 being scanned by the camera 348 may comprise the tag 124A of FIG. 1. As noted previously, the tag 124A of FIG. 1 may comprise machine-readable data such as a two-dimensional barcode that contains a unique identifier associated with a particular electronic cash register 126 and a particular merchant. The 2-D bar code may include, but is not limited to, the following symbologies: Aztec Code, 3-DI, ArrayTag, Small Aztec Code, Chromatic Alphabet, Chromocode, Codablock, Code 1, Code 16K, Code 49, ColorCode, Compact Matrix Code, CP Code, CyberCode, d-touch, DataGlyphs, Datamatrix, Datastrip Code, Dot Code A, EZcode, Grid Matrix Code, High Capacity Color Bar code, HueCode, INTACTA.CODE, InterCode, MaxiCode, mCode, MiniCode, Micro PDF417, MMCC, Nintendo e-Reader#Dot code, Optar, PaperDisk, PDF417, PDMark, QR Code, QuickMark Code, Semacode, SmartCode, Snowflake Code, ShotCode, SuperCode, Trillcode, UltraCode, UnisCode, VeriCode, VSCode, WaterCode, for example.

Instead of a two dimensional bar code, a one dimensional bar code may be employed to provide the unique electronic cash register identifier and the unique identifier associated with the merchant. Exemplary one-dimensional bar codes may include, but are not limited to, U.P.C., Codabar, Code 25—Non-interleaved 2 of 5, Code 25—Interleaved 2 of 5, Code 39, Code 93, Code 128, Code 128A, Code 128B, Code 128C, Code 11, CPC Binary, DUN 14, EAN 2, EAN 5, EAN 8, EAN 13, Facing Identification Mark, GS1-128 (formerly known as UCC/EAN-128), GS1 DataBar formerly Reduced Space Symbology ("RSS"), HIBC (HIBCC Bar Code Standard), ITF-14, Latent image bar code, Pharmacode, Plessey, PLANET, POSTNET, Intelligent Mail Bar code, MSI, PostBar, RM4SCC/KIX, JAN, and Telepen. Other machine readable codes for retrieving the unique identifiers associated with the electronic cash register 126 and merchant are well within the scope of the invention such as contact-less or wireless communication methods such as near-field communications (NFCs) used with smart cards and RF-ID cards as understood by one of ordinary skill in the art. Further, in another exemplary embodiment, the operator of the PCD 100 may key-in a human-readable code 223 associated with the unique identifier of the electronic cash register 126 and the merchant.

As discussed above, once the transaction controller 144 has the unique identifier associated with the electronic cash register 126 and the identifier associated with the merchant from the scanned image 210, then the transaction controller 144 may communicate with the POS controller 134 for receiving product scan data generated by the product scan 132A.

FIG. 2E is a diagram of a screen 202E that shows merchant information 212 relevant to a transaction and a line item listing 214 of products being scanned by a product scanner 132A coupled to an electronic cash register 126A. The merchant information 212 may comprise information such as, but not limited to, a merchant name, a mailing address of the store, date and time data relevant to the transaction, a store number, and a electronic cash register number, and other like information. The line item listing 214 of product scan data may comprise information such as, but not limited to, a product number, a short name for the product, a price and other similar information. According to an exemplary embodiment, an operator of the PCD 100 may shut "off" the line item listing 214 as a user defined preference which may be stored in the second storage device 146B.

While the product scanner 132A is scanning the machine-readable product codes from the products 130A, the transaction controller 144 may match these machine-readable product codes with coupon data that may be stored in the second storage device 146B that contains one or more client profiles associated with the PCD 100. If the transaction controller 144 determines a match between a coupon stored in the storage device 146B and a product 130A being scanned, the transaction controller 144 may prompt the operator of the PCD 100 to take some action, such as illustrated in FIG. 2F as described below.

FIG. 2F is a diagram of a screen 202F that shows merchant information relevant to a transaction and a coupon option 216 that may be selected by a user. Screen 202F may be generated in response to the transaction controller 144 determining a match between a coupon stored in the second storage device 146B and a product 130A being scanned. Screen 202F may list merchant information 212 and the coupon option 216 which prompts the user to decide whether or not to use a coupon that matches a product 130 which was scanned by the product scanner 132A. This coupon option 216 may be turned off by a user so that this screen 202F is not generated when a match is found by the transaction controller 144. A user may allow automatic matching of coupons as they are discovered by the transaction controller 144. In the exemplary screen 202F, the user is asked to decide whether or not to use a manufacturer's coupon that may reduce the price of purchase for a product 130A to zero. If the user decides not to use the coupon, then the coupon data may remain in the second storage device 146B until another match is found by the transaction controller 144.

FIG. 2G is a diagram of a screen 202G that shows merchant information 212 relevant to a transaction and a total bill for a purchase along with a plurality of payment options 218A that may be selected by user. In the example illustrated in FIG. 2G, the total amount due for the purchase is $16.90. The payment options 218A allow a user to select the expense as a business expense towards taxes. The payment options 218A also allow a user to select among a plurality of payment methods that may have been previously selected by the user and stored in a user's profile in the second storage device 146B. In other words, prior to conducting any transactions, an operator of the PCD 100 may arrange a predetermined listing of the sequence of payment methods which should be displayed to a user whenever the user employs the PCD 100 for a transaction. The operator of the PCD 100 may also create an association with the predetermined order of payment methods for particular merchants. This means that an operator of a PCD 100 may have a first sequence of payment methods for a first merchant and a second different sequence of payment methods for a second merchant that are stored in a client profile in the second database 146B. The transaction controller 144 may also display payment options 218A that provide the user with additional benefits such as credit cards affiliated with a current merchant which may award more loyalty points if the affiliated credit card is used for a purchase.

The operator of the PCD 100 may also select one or more different payment methods to pay the total final amount due for a particular purchase. So, for example, a user may select a credit card to pay a portion of the final bill along with payment from a stored value card and payment from a debit card. According to one exemplary aspect of the invention, the current balances of stored value accounts as well as remaining credit on credit card accounts may be displayed in conjunction with the payment options 218A that are available for selection by the user with the PCD 100 as illustrated in FIG. 2G.

According to another exemplary feature of the system 101, credit card issuers as well as debit card issuers and stored value account issuers do not need to send any physical tokens to an operator of the PCD 100 when new account numbers may be assigned to a particular user of the PCD 100. Instead of mailing physical tokens bearing the new account numbers, the issuers of the new account numbers may update the data in the first storage device 146A or secure vault. A corresponding message may be transmitted from the transaction controller 144 to the operator of the PCD 100 when new account numbers have been stored in the secure vault or first storage device 146A in place of old account numbers.

FIG. 2H is a diagram of a screen 202H that shows an electronic receipt 220A that may be provided upon completion of a transaction with a merchant. The electronic receipt 220A may comprise a product listing as well as the total price paid for the products 130A which were purchased. The payment method(s) selected by the user (though not illustrated) may also be displayed on the electronic receipt 220A.

FIG. 2I is a diagram of an exemplary machine-readable tag 124A that may be coupled to an electronic cash register 126 of a merchant. The machine-readable tag 124A may comprise a bar code 222 which may be scanned with a camera 348 of the PCD 100. The transaction software 501 running on the PCD 100 may be able to process the scanned barcode 222. As noted above, the bar code 222 may comprise either a one dimensional or two-dimensional barcode. Further, other machine-readable codes are included within the scope of the invention and may include contactless technologies, such as near-field communications (NFC) which may or may not be linked to a secure-element, and RFID cards as understood by one of ordinary skill in the art. For these contactless technologies, the tag 124A may comprise an antenna 224 coupled to an integrated-circuit chip (not illustrated). As described above, the tag 124A may provide a unique identifier associated with the electronic cash register 126 and a unique identifier associated with a merchant that operates the electronic cash register 126. These unique identifiers may be contained within the machine-readable code and/or associated with the code. The tag 124A may also comprise a human-readable code 223 that may be keyed-in by the user of the PCD 100 instead of scanning the machine-readable code 224 with the PCD 100.

Figure 3A:
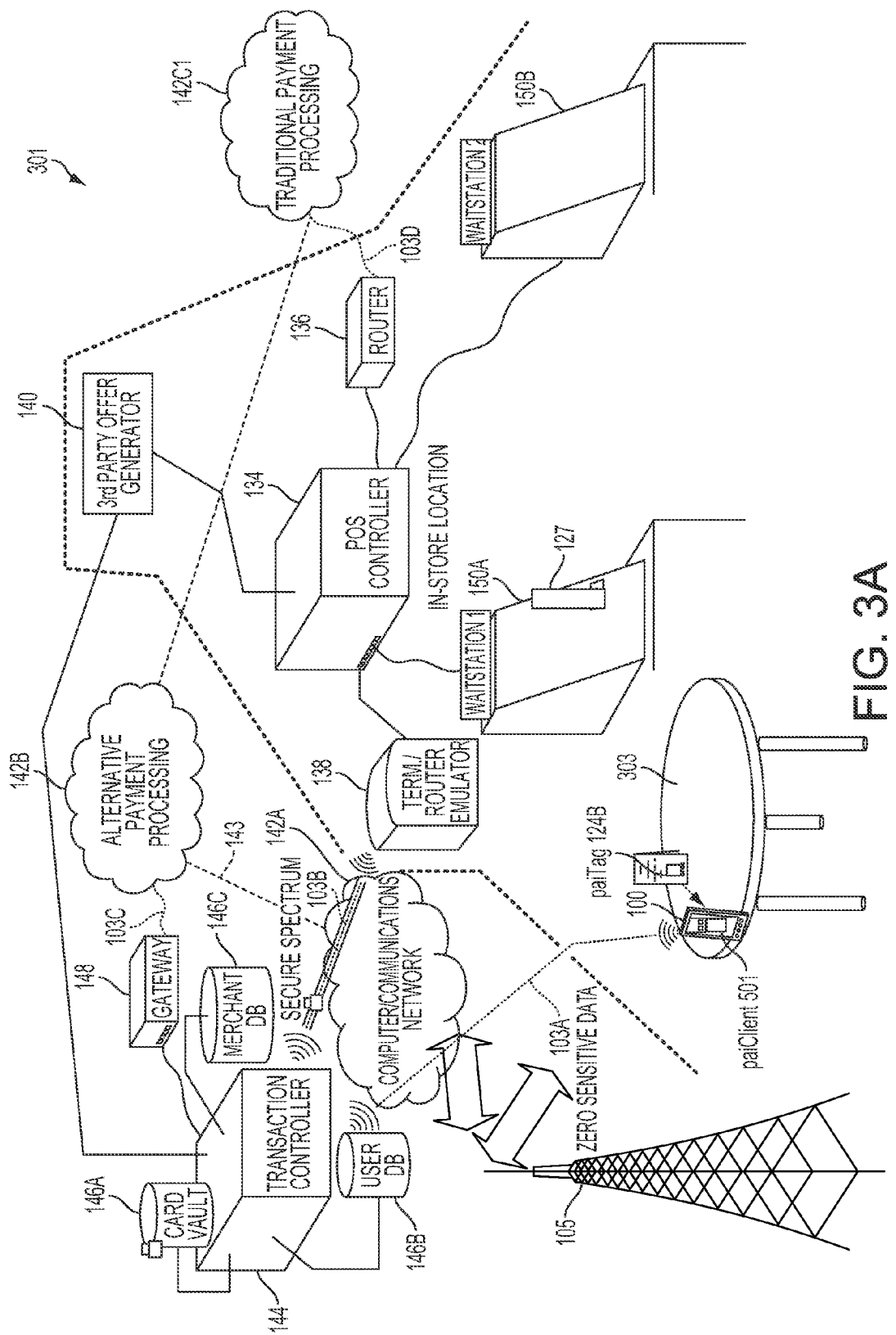
FIG. 3A is a diagram of an alternate exemplary embodiment of a system for managing transactions with the portable computing device.

FIG. 3A is a diagram of an alternate exemplary embodiment of a system 301 for managing transactions with the portable computing device 100. The system 301 of FIG. 3A is very similar to the system 101 of FIG. 1. Therefore only the differences between FIG. 3A and FIG. 1 will be described in further detail below.

The system 301 of FIG. 3A may generally support businesses such as restaurants or other establishments which may provide products as well as services and which usually do not employ product scanners 132 that are coupled to electronic cash registers 126. In this exemplary operating environment, other differences include electronic cash registers 126 not being present. However, one of ordinary skill the art recognizes that in some restaurant environments, depending upon the owner's preferences, may include electronic cash registers 126 without departing from the scope of the invention. According to the exemplary operating environment illustrated in FIG. 3A, terminals 150A-B are provided and are coupled to the POS controller 134. The terminals 150A-B may comprise token readers, such as magnetic-stripe readers, attached to or integral with the housing of the terminals 150 as understood by one of ordinary skill in the art.

In the exemplary embodiment illustrated in FIG. 3A, a machine-readable tag 124B may be placed on a table surface 303 so that it may be scanned in with a PCD 100 running the client transaction manager module 501. The machine-readable tag 124B may be part of a menu or a display component that is very accessible to an operator of the PCD 100.

Figure 3B:
FIG. 3B is a diagram of an exemplary machine-readable tag that may be positioned on a surface such as a table at a restaurant.

FIG. 3B is a diagram of an exemplary machine-readable tag 124B that may be positioned on a surface 303 such as a table at a restaurant. In this exemplary embodiment, the machine-readable code 222 may be integral with an advertisement about the restaurant. The advertisement may also convey an offer which may be available to an operator of a PCD 100. To encourage patrons of the restaurant to utilize the payment system 301 instead of traditional card tokens associated with traditional forms of payment, the restaurant may entice the operators of PCDs 100 with special offers such as an offer for a free appetizer if the operator of the PCD 100 scans the machine-readable code 222 with the PCD 100 in order to indicate that the patron will likely pay his or her final bill with the PCD 100.

In response to scanning the machine-readable code 222 of FIG. 3B, the transaction controller 144 may generate a message and send the message to the display of the PCD 100 as illustrated in FIG. 3C.

FIG. 3C is a diagram of a screen 202I that shows relevant merchant information 228 and an options 230 for an offer from a merchant that may be selected by a user prior to the end of a transaction. The options 230 for the offer may include one or more choices of food products sold by the restaurant which is utilizing the system 301 as illustrated in FIG. 3A described above. In the exemplary embodiment illustrated in FIG. 3C, the choices of food products include, but are not limited to, free cheese sticks and free potato skins.

Once an option 230 is selected by an operator of the PCD 100, the PCD 100 may relay this information back to the payment controller 144 which in turn relays this information to the terminal/router emulator 138. The terminals/router emulator 138 then sends this appetizer selection message to one or more terminals 150. A waiter or service professional monitoring the terminal 150 may be provided with a display of the appetizer selected by the operator of the PCD 100. Along these lines, in other exemplary embodiments, the operator of the PCD 100 may also select all of their food items from a menu by scanning in machine-readable codes from the menu or by keying-in codes or names of food items listed in the menu.

FIG. 3D is a diagram of a screen 202J that shows merchant information 228 relevant to a transaction and a total bill 218B for a purchase along with a plurality of payment options that may be selected by user. The total bill 218B comprising the plurality of payment options that may be selected by user is very similar to the total bill 218A described above in connection with FIG. 2G. As noted previously, one or more payment options may be selected by the user with this screen 202J. The payment options may also provide or display any remaining balances available with credit card accounts as well as balances available for debit accounts so that the user will know if there are sufficient funds in respect of accounts to pay for the final bill. Also with this screen 202J, a drop-down menu 229 may be provided for display and selection of an appropriate amount of tip corresponding to the service provided at the merchant such for the service provided by a waiter at a restaurant.

FIG. 3E is a diagram of a screen 202K that shows electronic receipt 220B that may be provided upon completion of a transaction with a merchant, such as a restaurant. The electronic receipt 220B of screen 202K is very similar to the electronic receipt 220A of screen 202H noted above. The electronic receipt 220B may list the food products purchased, as well as the tip for service selected, a total bill amount, and the payment method which was selected for the transaction.

Figure 4B:
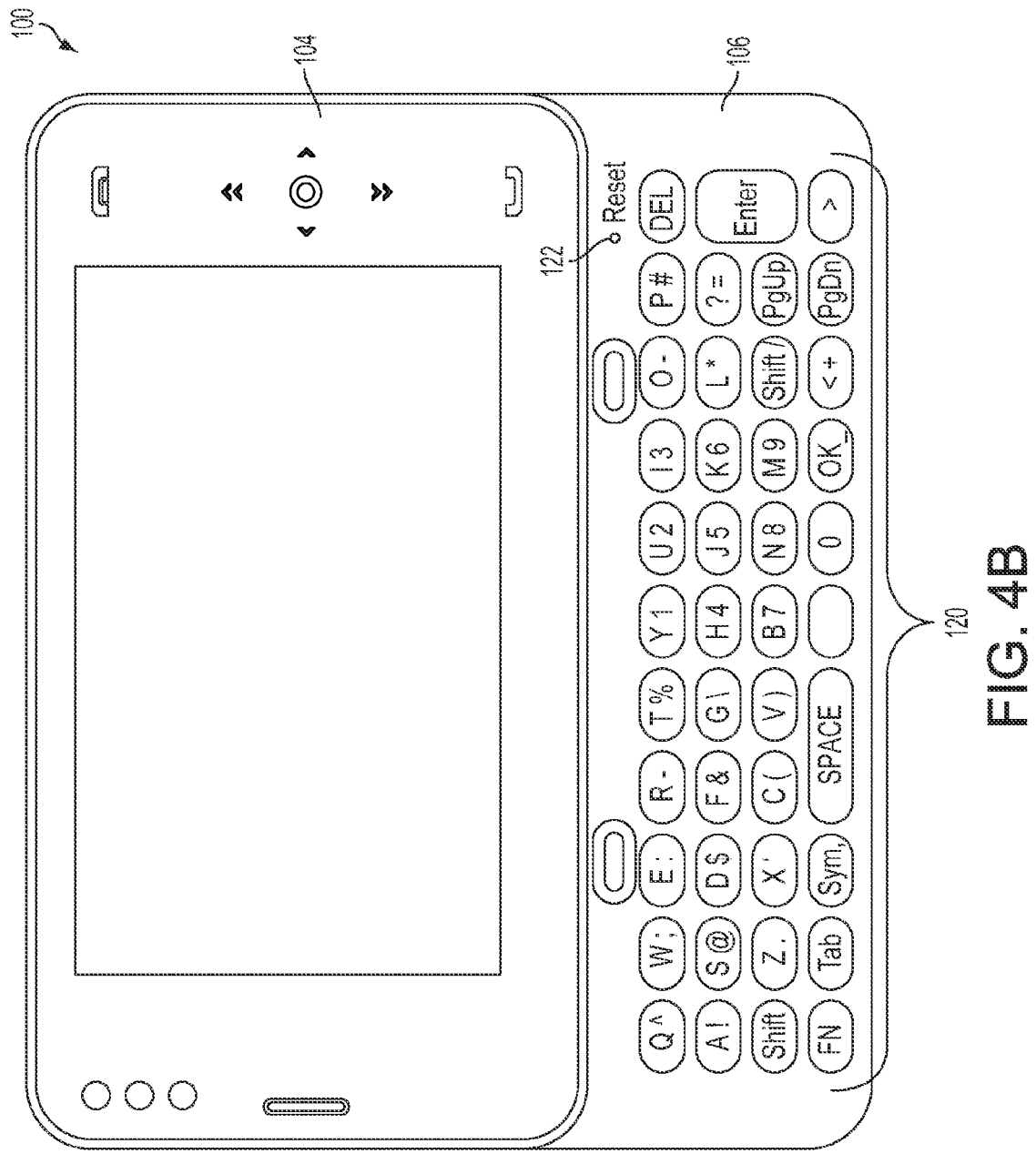
FIG. 4B is a front plan view of the first aspect of a PCD in an open position.

Referring to FIG. 4A and FIG. 4B, an exemplary portable computing device (PCD) is shown and is generally designated 100. As shown, the PCD 100 may include a housing 102. The housing 102 may include an upper housing portion 104 and a lower housing portion 106. FIG. 4A shows that the upper housing portion 104 may include a display 108. In a particular aspect, the display 108 may be a touch screen display. The upper housing portion 104 may also include a trackball input device 110. Further, as shown in FIG. 4A, the upper housing portion 104 may include a power on button 112 and a power off button 114. As shown in FIG. 4A, the upper housing portion 104 of the PCD 100 may include a plurality of indicator lights 116 and a speaker 118. Each indicator light 116 may be a light emitting diode (LED).

In a particular aspect, as depicted in FIG. 4B, the upper housing portion 104 is movable relative to the lower housing portion 106. Specifically, the upper housing portion 104 may be slidable relative to the lower housing portion 106. As shown in FIG. 4B, the lower housing portion 106 may include a multi-button keyboard 120. In a particular aspect, the multi-button keyboard 120 may be a standard QWERTY keyboard. The multi-button keyboard 120 may be revealed when the upper housing portion 104 is moved relative to the lower housing portion 106. FIG. 4B further illustrates that the PCD 100 may include a reset button 122 on the lower housing portion 106.

Figure 4C:
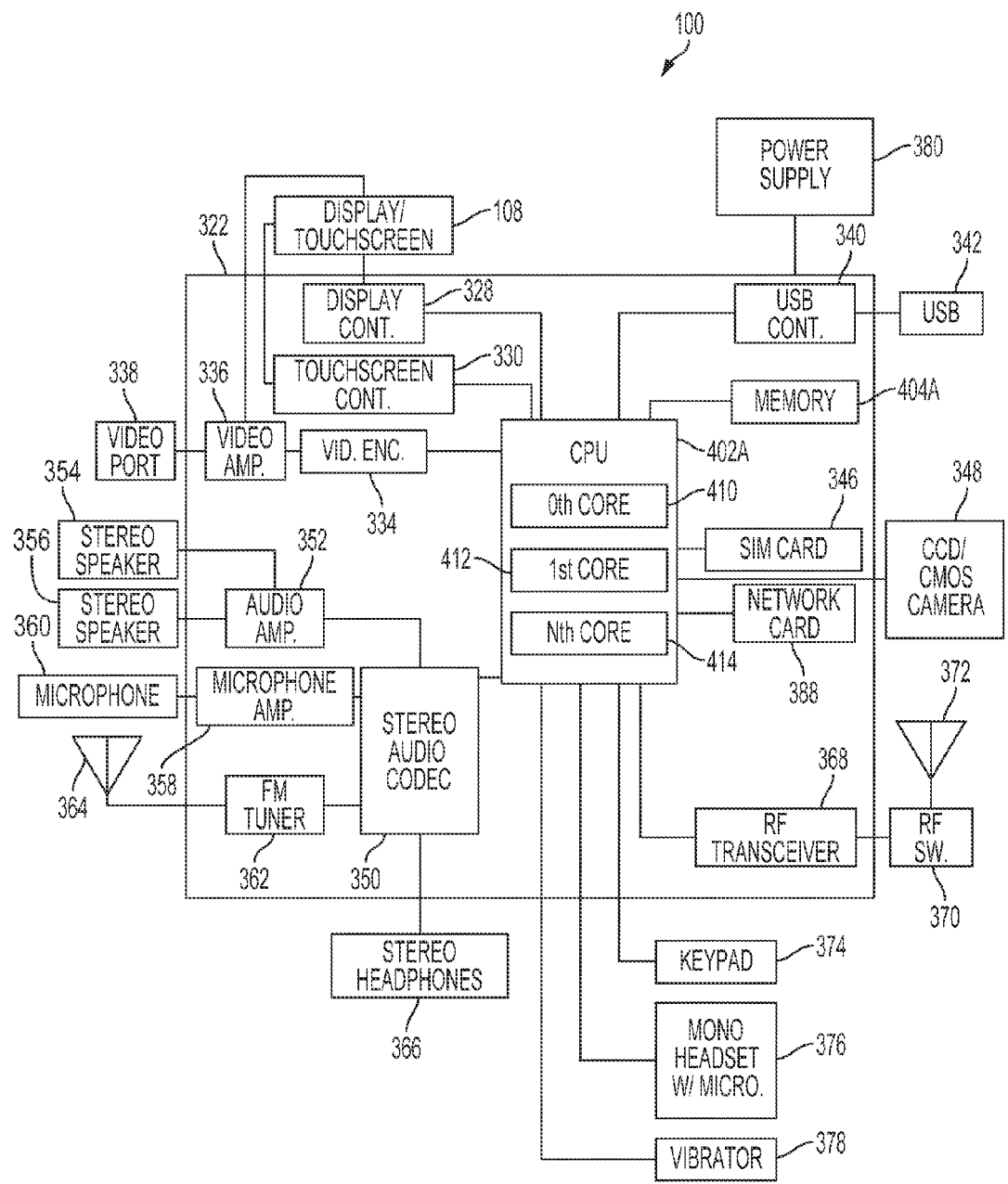
FIG. 4C is a block diagram of a second aspect of a PCD.

Referring to FIG. 4C, an exemplary, non-limiting aspect of a portable computing device (PCD) is shown and is generally designated 100. As shown, the PCD 100 includes an on-chip system 322 that includes a multicore CPU 402. The multicore CPU 402 may include a zeroth core 410, a first core 412, and an Nth core 414.

As illustrated in FIG. 4C, a display controller 328 and a touch screen controller 330 are coupled to the multicore CPU 402. In turn, a touch screen display 108 external to the on-chip system 322 is coupled to the display controller 328 and the touch screen controller 330.

FIG. 4C further shows that a video encoder 334, e.g., a phase alternating line (PAL) encoder, a sequential color a memoire (SECAM) encoder, or a national television system(s) committee (NTSC) encoder, is coupled to the multicore CPU 402. Further, a video amplifier 336 is coupled to the video encoder 334 and the touch screen display 108. Also, a video port 338 is coupled to the video amplifier 336. As shown in FIG. 4C, a universal serial bus (USB) controller 340 is coupled to the multicore CPU 402. Also, a USB port 342 is coupled to the USB controller 340. Memory 404A and a subscriber identity module (SIM) card 346 may also be coupled to the multicore CPU 402.

Further, as shown in FIG. 4C, a digital camera 348 may be coupled to the multicore CPU 402. In an exemplary aspect, the digital camera 348 is a charge-coupled device (CCD) camera or a complementary metal-oxide semiconductor (CMOS) camera.

As further illustrated in FIG. 4C, a stereo audio coder-decoder (CODEC) 350 may be coupled to the multicore CPU 402. Moreover, an audio amplifier 352 may coupled to the stereo audio CODEC 350. In an exemplary aspect, a first stereo speaker 354 and a second stereo speaker 356 are coupled to the audio amplifier 352. FIG. 4C shows that a microphone amplifier 358 may be also coupled to the stereo audio CODEC 350. Additionally, a microphone 360 may be coupled to the microphone amplifier 358. In a particular aspect, a frequency modulation (FM) radio tuner 362 may be coupled to the stereo audio CODEC 350. Also, an FM antenna 364 is coupled to the FM radio tuner 362. Further, stereo headphones 366 may be coupled to the stereo audio CODEC 350.

FIG. 4C further illustrates that a radio frequency (RF) transceiver 368 may be coupled to the multicore CPU 402. An RF switch 370 may be coupled to the RF transceiver 368 and an RF antenna 372. As shown in FIG. 4C, a keypad 374 may be coupled to the multicore CPU 402. Also, a mono headset with a microphone 376 may be coupled to the multicore CPU 402. Further, a vibrator device 378 may be coupled to the multicore CPU 402. FIG. 4C also shows that a power supply 380 may be coupled to the on-chip system 322. In a particular aspect, the power supply 380 is a direct current (DC) power supply that provides power to the various components of the PCD 100 that require power. Further, in a particular aspect, the power supply is a rechargeable DC battery or a DC power supply that is derived from an alternating current (AC) to DC transformer that is connected to an AC power source.

FIG. 4C further indicates that the PCD 100 may also include a network card 388 that may be used to access a data network, e.g., a local area network, a personal area network, or any other network. The network card 388 may be a Bluetooth network card, a WiFi network card, a personal area network (PAN) card, a personal area network ultra-low-power technology (PeANUT) network card, or any other network card well known in the art. Further, the network card 388 may be incorporated into a chip, i.e., the network card 388 may be a full solution in a chip, and may not be a separate network card 388.

As depicted in FIG. 4C, the touch screen display 108, the video port 338, the USB port 342, the camera 348, the first stereo speaker 354, the second stereo speaker 356, the microphone 360, the FM antenna 364, the stereo headphones 366, the RF switch 370, the RF antenna 372, the keypad 374, the mono headset 376, the vibrator 378, and the power supply 380 are external to the on-chip system 322.

In a particular aspect, one or more of the method steps described herein may be stored in the memory 404A as well as in the transaction controller 144, T/R emulator 138, POS controller 134, and the storage devices 146A-C as computer program instructions. These instructions may be executed by the multicore CPU 402, transaction controller 144, T/R emulator 138, and POS controller 134 in order to perform the methods described herein. Further, the multicore CPU 402, T/R emulator 138, POS controller 134, storage devices 146A-C, and memory 404A of the PCD 100, or a combination thereof may serve as a means for executing one or more of the method steps described herein.

Figure 5:
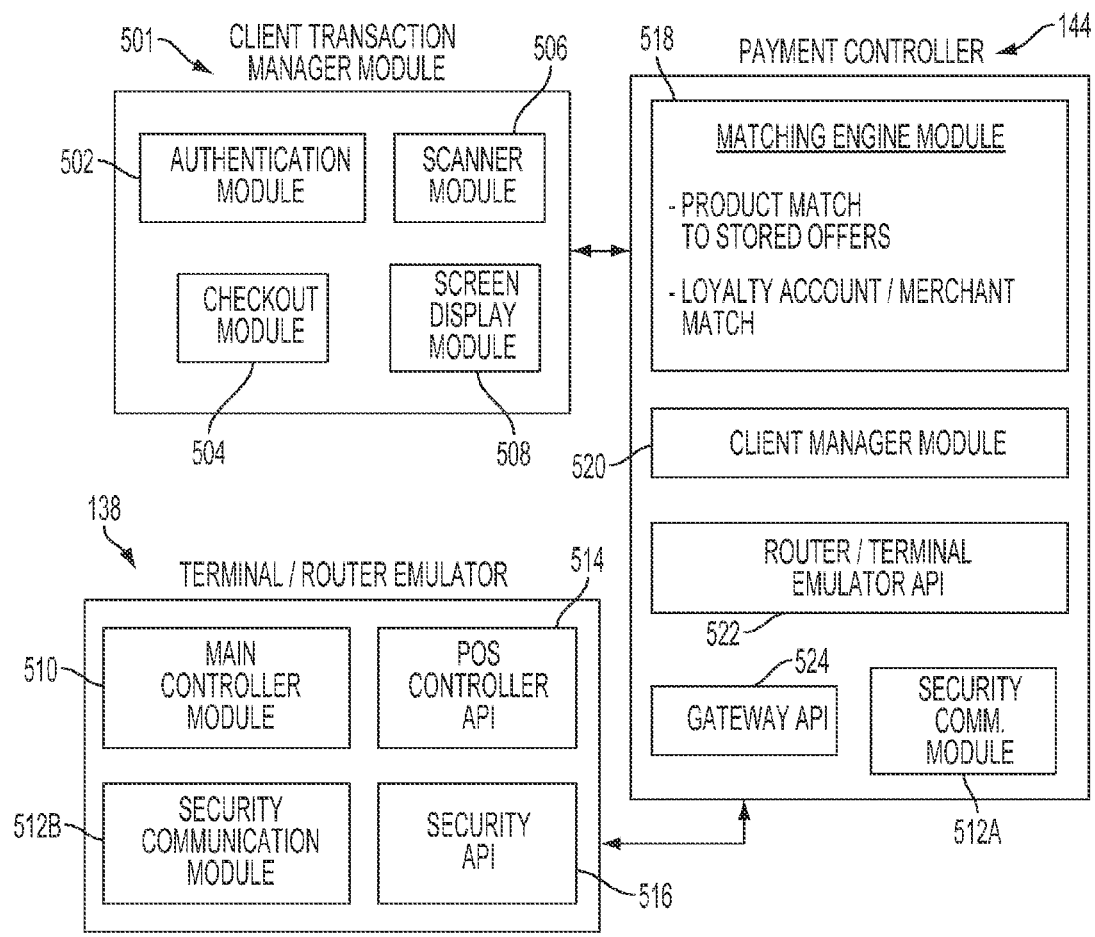
FIG. 5 is a block diagram of an exemplary software architecture for the PCD, the transaction controller, and the terminal/router emulator.

FIG. 5 is a functional block diagram of an exemplary software architecture for the PCD 100, the transaction controller 144, and the terminal/router emulator 138. The program modules described below are exemplary only. Additional or fewer modules may be utilized without departing from the scope and spirit of the invention as understood by one of ordinary skill the art.

The client transaction manager 501 of the PCD 100 may comprise an authentication module 502, a checkout module 504, a scanner module 506, and a screen display module 508. The authentication module 502 may be responsible for prompting a user for credentials to log into the system 101. The authentication module 502 may relay and communicate with the transaction controller 144 in order to authenticate a user or operator of the PCD 100.

The scanner module 506 may be responsible for monitoring input from the camera 348 for the contents of the tag 124. If the PCD 100 also comprises hardware for supporting NFC and RFID scans, the scanner module 506 may also monitor these elements for any scans of the machine-readable code 222. The scanner module 506 may comprise one or more algorithms for recognizing the machine-readable code 222 present on the tag 124.

The checkout module 504 may monitor and format messages received from the transaction controller 144 that may comprise information about product scan data relayed by the transaction controller 144. The checkout module 504 may be responsible for formatting any information that it receives from the transaction controller 144. The checkout module 504 may also be responsible for prompting a user to select certain options on offers that may be found by the transaction controller 144 when the transaction controller 144 determine matches between product scan data and offers available to the operator of the PCD 100.

The screen display module 508 may monitor the display/touchscreen 108 for input from the operator of the PCD 100. The screen display module 508 may also format any data that it receives from the checkout module 504 for presentation on the display/touchscreen 108.

As illustrated in FIG. 5 and in FIG. 1, the PCD 100 which executes the client transaction manager 501 is coupled to the transaction controller 144 via the computer communications network 142A. The transaction controller 144 may comprise a matching engine module 518, a client manager module 520, a router/terminal emulator application programming interface (API) 522, a gateway application programming interface (API) 524, and a security communication module 512A.

The matching engine module 518 may be responsible for matching product scan data with stored offer data present in the second storage device 146B. The matching engine module 518 also manages and reviews the data stored in the remaining first and third stored devices 146A and 146C. This means that the matching engine module 518 has access to the payment account information provided within the first storage device 146A also referred to as a secure vault. The matching engine module 518 also has access to the third storage device 146C which may contain various rules that are specific to a particular merchant.

The matching engine module 518 may comprise one or more rules and/or algorithms to assist the module 518 in determining if one or more offers should be presented to the operator of the PCD 100 when the PCD 100 is used for payment at a particular merchant such as in a retail environment and/or in a restaurant environment. The matching engine module 518 may also be responsible for determining if there is a match between an operator's loyalty account and the merchant identifier received from the tag 124. The matching engine module 518 may also determine if there is a match between certain payment methods, like credit cards, and the merchant identifier received from the tag 124. Other matching functions not specifically described for the matching engine 518 are well within the scope of the invention.

The client manager module 520 may be responsible for the communications exchanged between the transaction controller 144 and the PCD 100. The client manager module 520 may establish and monitor the communication link 103A between the transaction controller 144 and the PCD 100. Usually, the communication link 103A between the transaction controller 144 and the PCD 100 does not need to be secure since sensitive financial transaction data, such as, but not limited to, complete credit card information, is usually not transmitted over the communication link 103A. However, if sensitive financial transaction data is transmitted over the communications link 103A, the client manager module 520 may utilize a security communication module 512A which may be responsible for establishing a secure communication link using one or more encryption methods as understood by one of ordinary skill the art.

The router/terminal emulator API module 520 may be responsible for managing communications between the transaction controller 144 and the terminal/router (T/R) emulator 138. On occasion, when the transaction controller 144 has been requested to send sensitive financial transaction data, such as credit card magnetic stripe data from the secure vault or first storage device 146A, the router/terminal emulator API module 520 may send this request using the security communication module 512A.

The security communication module 512A may be responsible for establishing a secure communications link or secure channel 103B between the transaction controller 144 in the terminal/router emulator 138. To establish this secure communication channel 103B, security communication module 512A may comprise a secure element/algorithm that works in combination with one or more encryption methods as understood by one of ordinary skill the art.

The router/terminal emulator API module 520 may be responsible for transmitting secure financial transaction data, such as the magnetic stripe credit card data described above, in addition to transmitting payment authorizations received from the alternative payment processing elements from the second computer communications network 142B. The router/terminal emulator API module 520 may also transmit matched offer data, such as coupons and merchant loyalty data, to the terminal/router emulator 138. The router/terminal emulator API module 520 may also receive and process product scan data as well as request for alternative payment processing which is part of the second computer communications network 142B.

The gateway API module 524 may be responsible for managing communications between the gateway device 148 and the transaction controller 144. This means that the gateway API module 524 may transmit payment requests to the gateway 148 as well as receiving payment authorizations from the gateway 148 as understood by one of ordinary skill the art.

The transaction controller 144 executing the modules as described above is also coupled to the terminal/router emulator 138 as illustrated in FIG. 5 and FIG. 1. The terminal/router emulator 138 may comprise a main controller module 510, a security communication module 512B, a POS controller application programming interface (API) 514, and a security application programming interface 516.

The main controller module 510 may be responsible for managing most of the communications which are sent to and received from the transaction controller 144. The main controller module 510 may route product scan data requests as well as loyalty account matches to the POS controller 134. The main controller 510 may also handle alternative payment authorizations and traditional payment data, such as magnetic stripe data for a credit card, received from the transaction controller 144. The main controller module 510 may also route product scan data received from the POS controller 134 destined for the transaction controller 144. The main controller module 510 may also route third-party offers created by the third-party offer generator 140.

To communicate with the POS controller 134, the main controller module 510 may route its communication is through the POS controller API 514. The POS controller API 514 may be responsible for translating messages to the POS controller 134 and translating messages from the POS controller 134. As noted previously, the POS controller 134 may utilize unified POS or JAVA™ POS as its primary language as understood by one of ordinary skill in the art.

The security communication module 512B of the terminal/router emulator 138 may be complementary relative to the security communication module 512A of the transaction controller 144. That is, the security communication module 512B may be utilized to establish a secure communication channel 103B between the terminal/router emulator 138 and the transaction controller 144.

The security communication module 512B may comprise a secure element/algorithm that works in combination with one or more encryption methods as understood by one of ordinary skill the art. A security communication module 512B may work in combination with a security API module 516 if the security communication module 512B of the terminal/router emulator 138 is different relative to the security communication module 512A of the transaction controller 144.

Figure 6:
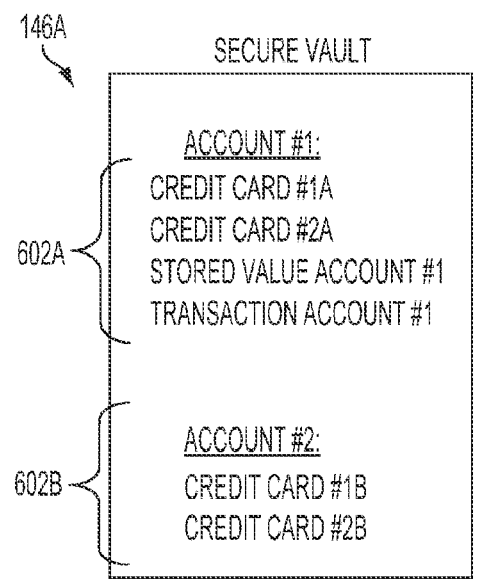
FIG. 6 is a data structure for a secure vault database managed by the transaction controller illustrated in FIG. 1.

FIG. 6 is a data structure for a secure vault or first storage device 146A managed by the transaction controller 144 illustrated in FIG. 1. The data structure for the first storage device 146A may comprise payment account information sorted or categorized according to each client or operator of the PCD 100. The payment account information may comprise all necessary data which may be required to complete a transaction with a particular form of payment. For example, the first payment account 602A may comprise data for a first credit card, a second credit card, a stored value account, and a transactional account such as a debit card account or a checking account. Since the payment account information typically comprises sensitive financial data such as the main information elements from credit cards like the credit card account number, expiration dates, security codes, and other similar information, the first storage device 146A is typically maintained in a secure manner. Therefore, one or more security elements and/or algorithms may be employed utilizing standard data encryption algorithms and methods as understood by one of ordinary skill the art.

The first storage device 146A may comprise a database such as a sequential query language (SQL) database as understood by one of ordinary skill the art. In such a scenario, the matching engine module 518 of the transaction controller 144 may also comprise an internal database application programming interface (API) as appropriate and as understood by one of ordinary skill the art for communicating with the first storage device 146A.

As noted previously, credit card issuers as well as debit card issuers and stored value account issuers do not need to send any physical tokens to an operator of the PCD 100 when new account numbers may be assigned to a particular user of the PCD 100. Instead of mailing physical tokens bearing the new account numbers, the issuers of the new account numbers may update the data in the first storage device 146A or secure vault. A corresponding message may be transmitted from the transaction controller 144 to the operator of the PCD 100 when new account numbers have been stored in the secure vault in place of old account numbers. In this way, the operator or user of PCD 100 does not need to receive a physical token corresponding to a new account number that may have been issued by a credit card vendor, a debit card vendor, a loyalty card vendor, and the like.

Figure 7:
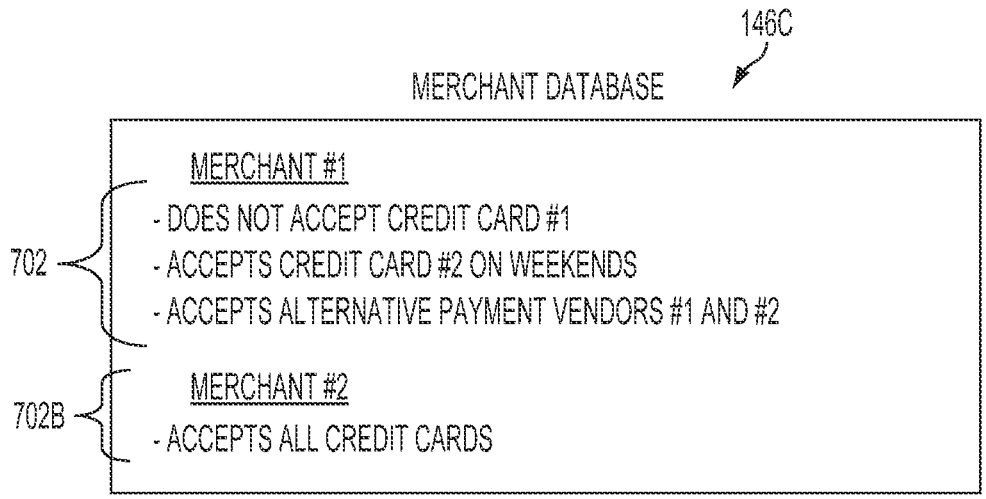
FIG. 7 is a data structure for a merchant database managed by the transaction controller illustrated in FIG. 1.

FIG. 7 is a data structure for the third storage device 146C or merchant database managed by the transaction controller 144 illustrated in FIG. 1. The third storage device 146C may comprise merchant data 702 such as rules, such as but not limited to, rules that describe what forms of payment may be acceptable to a particular merchant. For example, for the first merchant data 702A illustrated in FIG. 7, this data 702A indicates that a first merchant does not accept certain forms of payment, such as a first credit card, however the merchant does except a second credit card during certain periods of time, such as on weekends. This exemplary first merchant data 702A also indicates that the first merchant accepts alternative payment from a first vendor and a second vendor, which could comprise vendors like a PAYPAL™ brand on-line financial institution and SPRINT™ brand mobile telephone network. Other rules and/or merchant preferences may also be stored within the third database 146C.

The third storage device 146C may comprise a database such as a sequential query language (SQL) database as understood by one of ordinary skill the art. In such a scenario, the matching engine module 518 of the transaction controller 144 may also comprise an internal database application programming interface (API) as appropriate and as understood by one of ordinary skill the art for communicating with the third storage device 146C.

Figure 8:
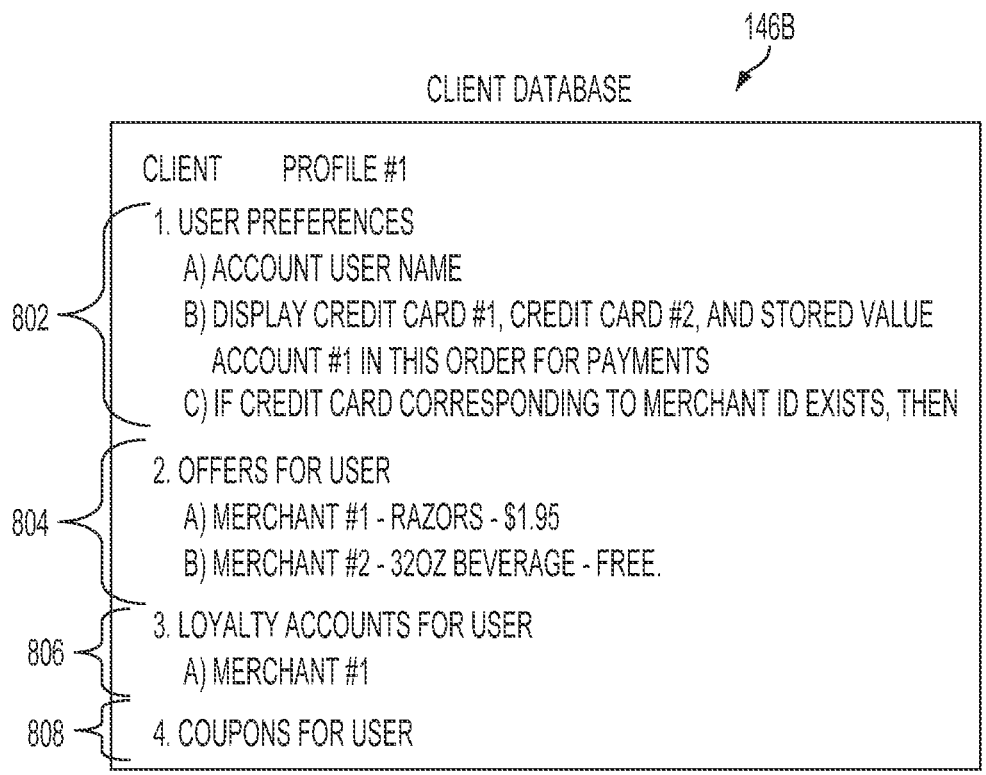
FIG. 8 is a data structure for a client database managed by the transaction controller illustrated in FIG. 1.

FIG. 8 is a data structure for a client database of the second storage device 146B managed by the transaction controller 144 illustrated in FIG. 1. The data structure of the second storage device 146B may comprise a plurality of client profiles corresponding to users or operators of PCD 100. The plurality of client profiles may also correspond with the usernames 204 that are entered in the first screen 202A of FIG. 2A. Each client profile stored on the second storage device 146B as a client database may comprise user preference data 802, offer data 804, loyalty account data 806, and coupon data 808.

The user preference data 802 may comprise a preferred account username and a sequence/order of preferred payment method options that may be preselected or predetermined by a user or operator of the PCD 100. In other words, as part of a client profile, a user or operator of a PCD 100 may specify certain payment methods to be displayed when payment is required after a final bill for a purchase has been calculated by the system 101. The user or operator of PCD 100 may also specify one or more rules that are executed by the transaction controller 144, and specifically the matching engine 518, in order to display preferred payment methods to the user of PCD 100.

For example, in the first client profile comprising the user preference data 802 of FIG. 8, the user has selected to display a first credit card vendor, a second credit card vendor, and a stored value account vendor in this sequence when payment is required for purchase. The user of PCD 100 corresponding to this first client profile has also specified that if a credit card corresponding to a merchant identifier taken from the tag 124 exists, then this credit card should be displayed as a payment option for the user of the PCD 100. Other customized rules and user defined preferences not specifically enumerated and which may be provided by the user of the PCD 100 are within the scope of the invention.

Another interesting feature of the client profiles which can be stored in the second storage device 146B is the coupon data 808. A user or operator of PCD 100 may find coupons prior to making a purchase from a merchant. For example, the user of PCD 100 may select coupons from an online database which are then transferred to the coupon data 808 maintained by the second storage device 146B. The coupon data 808 may also comprise coupons which are generated at the end of a transaction by a third-party offer generator 140, such as devices provided by Catalina marketing as of this writing. In this way, a user operator of PCD 100 does not need to keep or carry physical coupons on their person compared to conventional shopping methods.

Another beneficial feature of the client profiles maintained by the second storage device 146B is the loyalty account data 806. The loyalty account data 806 may track various loyalty accounts that correspond with different merchants. The loyalty account data 806 may also track loyalty points earned by a user of PCD 100 when certain purchases are made at particular merchants corresponding to the loyalty account. When a user of the PCD 100 has elected to use the system 101 for processing payments of purchases, the transaction controller 144 may retrieve loyalty account data 806 after the information from the tag 124 is collected from the PCD 100. This retrieval of the loyalty account data 806 may occur prior to or during the generation of product scan data by the product scanner 132 so that appropriate discounts corresponding to the loyalty account data 806 may be applied by the POS controller 134.

The second storage device 146B may comprise a database such as a sequential query language (SQL) database as understood by one of ordinary skill the art. In such a scenario, the matching engine module 518 of the transaction controller 144 may also comprise an internal database application programming interface (API) as appropriate and as understood by one of ordinary skill the art for communicating with the second storage device 146B.

Figure 9A:
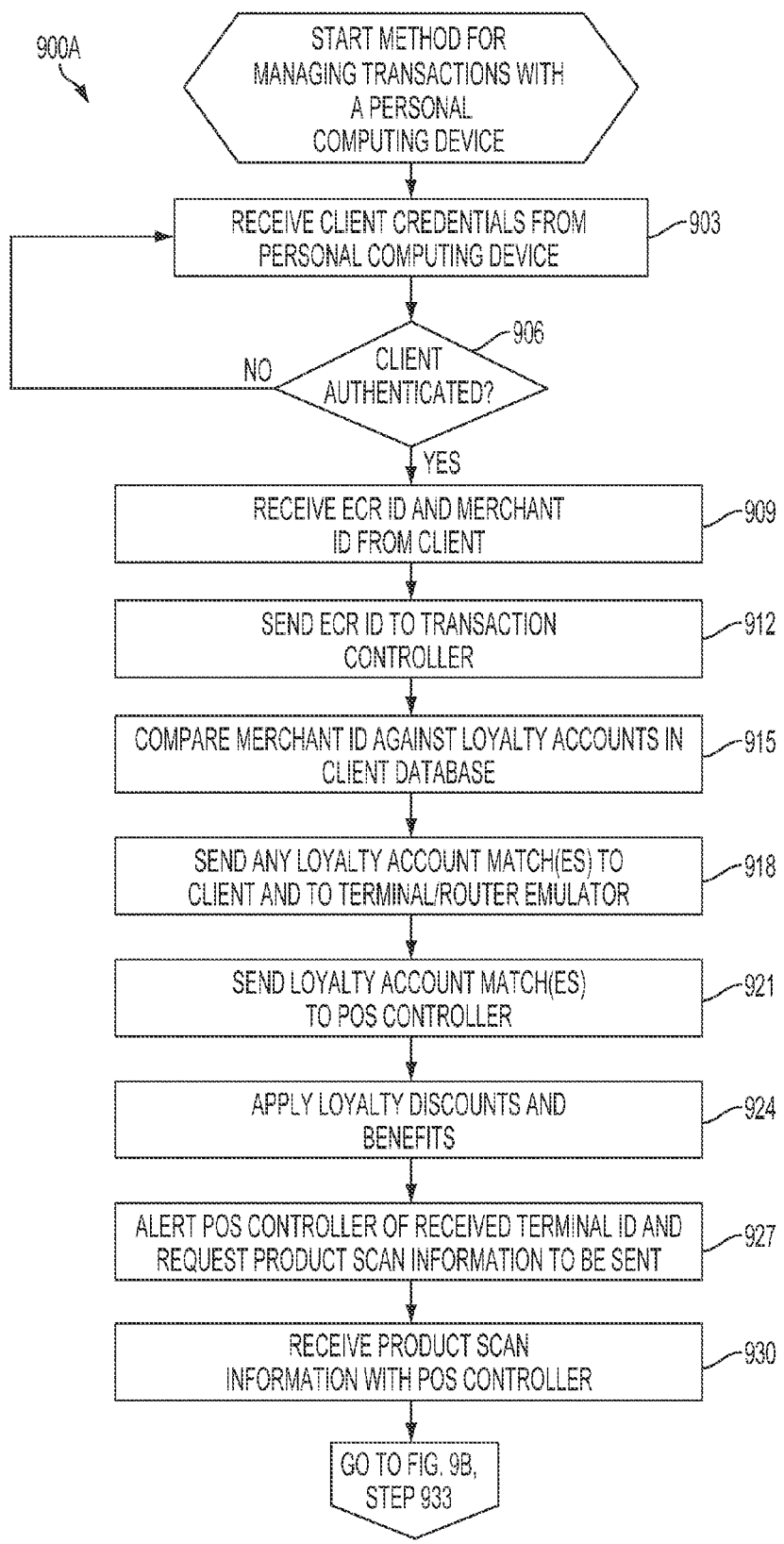
FIGS. 9A-9D are flowcharts illustrating a method for managing transactions with a PCD.

FIG. 9A is a flowchart illustrating a method 900A for managing transactions with a PCD 100. Block 903 is the first step in the process 900 for managing transactions with the PCD 100. In block 903, the client credentials entered in screens 202A and 202B of FIGS. 2A-2B are received by the transaction controller 144 from the portable computing device (PCD) 100. As noted previously, the client credentials may comprise a user name 204, a password 206, and a unique identifier assigned to the PCD 100.

Next, in decision block 906, the transaction controller 144 determines if the client is authenticated based on the credentials that it received in block 903. In this decision block 906, the transaction controller 144 may verify that the user name 204 of screen 202A matches the unique client identifier assigned to the PCD 100 which is maintained in the second storage device 146B comprising the client database or client profiles. If the transaction controller 144 verifies that the user name 204 matches the client unique identifier assigned to the PCD 100, then the transaction controller 144 checks to see if the password 206 of screen 202B matches the username 204 of screen 202A based on a review of the client profile stored in the second storage device 146B.

If the inquiry to decision block 906 is negative, then the "No" branch is followed back to step 903 for receiving the client's credentials for a predetermined number of times. If the inquiry to decision block 906 is positive, then the "Yes" branch is followed to block 909 in which the electronic cash register or terminal identifier and merchant identifier are received from the PCD 100. In this block, the PCD 100 may conduct a scan of the tag 124 that comprises the bar code 222 which contains the electronic cash register or terminal identifier as well as the merchant identifier.

Next, in block 912, the ECR or terminal identifier and the merchant identifier are transmitted by the PCD 100 over the first computer communications network 142A to the transaction controller 144. Subsequently, in block 915, the transaction controller 144, and specifically the matching engine 518, may compare the merchant identifier received against the loyalty data 806 stored in the second storage device 146B as illustrated in FIG. 1 and FIG. 8.

If the transaction controller 144 determines that there is one or more matches between any loyalty account data 806 and the merchant identifier, then in block 918 the transaction controller 144 sends the loyalty account data 806 over the first computer communications network 142A to the terminal/router emulator 138.

In block 921, the terminal/router emulator sends the loyalty account data 806 to the POS controller 134. Next in block 924, when the POS controller 134 receives the loyalty account data 806, the POS controller 134 may apply appropriate discounts and/or benefits. The application of the discounts and/or benefits may be based on the products 130 purchased by the user of the PCD 100 or they may be based on other factors or a combination of factors such as the number of re-occurrences of purchasing products from the merchant.

Next, in block 927, the transaction controller 144 via the terminal/router emulator 138 may alert the POS controller 134 of the received electronic cash register or terminal identifier and request product scan information to be sent to the terminal/router emulator 138 so that the transaction controller 144 may relay this information to the PCD 100 as described below.

Next, in block 930, product scan information may be received by the POS controller 134 via the electronic cash register 126 and the product scanner 132. The process then continue continues to block 933 of FIG. 9B.

Figure 9B:
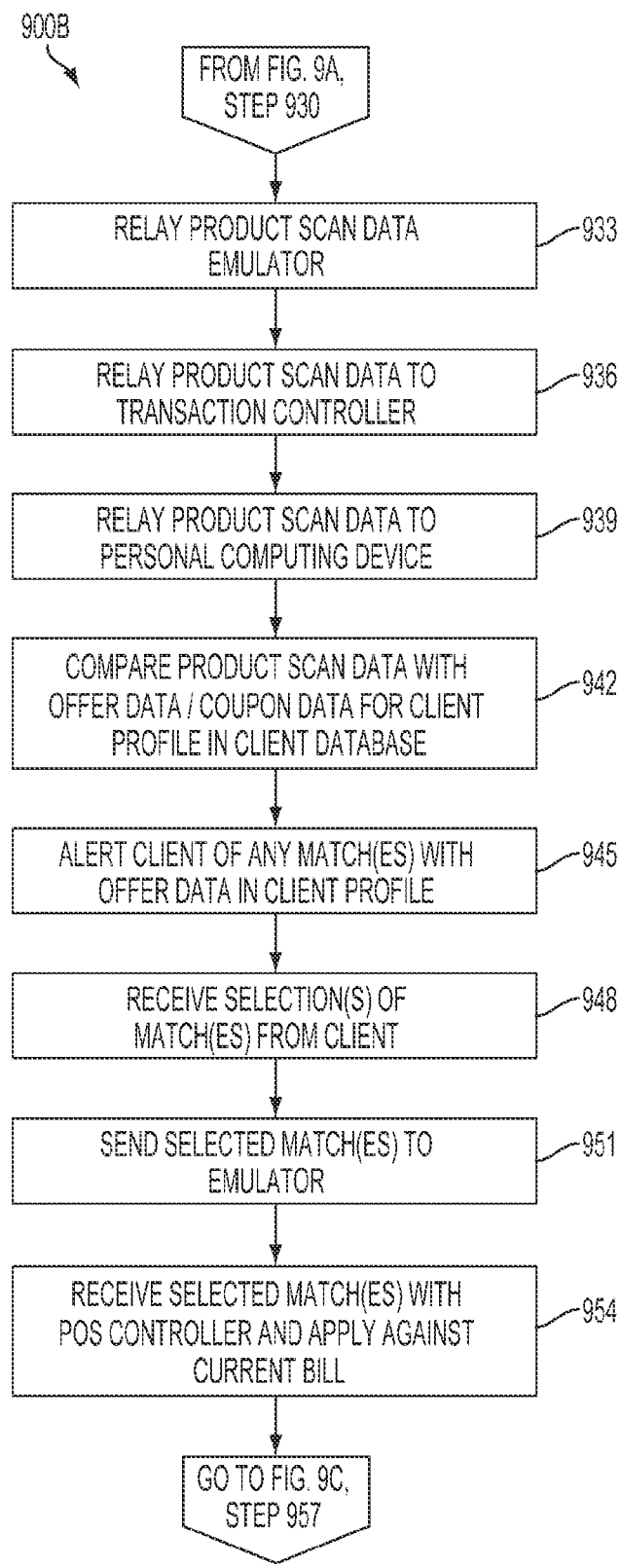

FIG. 9B is a continuation flowchart corresponding to the flowchart of FIG. 9A which illustrates a method 900B for managing transactions with a PCD 100. Block 933 is the first block of this continuation flowchart for managing transactions with the PCD 100. In block 933, the POS controller 134 may relay product scan data to the terminal/router emulator 138. Next, in block 936, the terminal/router emulator 138 may transmit the product scan data via the communication link 103B and over the first computer communications network 142A to the transaction controller 144.

In block 939, the transaction controller 144 may relay the product scan data to the portable computing device 100 via the first computer communication network 142A and the communication link 103A. In this block 939, the PCD 100 may display the product scan data on the display device 108 of the PCD 100. However, according to one exemplary embodiment, the operator or user of PCD 100 may select an option for turning "off" the display of product scan data according to his or her discretion/preferences which are stored in the second database 146B.

Next, in block 942, the transaction controller 144 may compare the received product scan data with the offer data 804 as well as with the coupon data 808 of the second storage device 146B as illustrated in FIG. 8. In block 945, the transaction controller 144 may alert the PCD 100 of any matches with the offer data 804 and coupon data 808. Specifically, the transaction controller 144 may generate a message that is formatted and received by the PCD 100 and displayed as a selectable option as illustrated in screen 202F as illustrated in FIG. 2F.

However, according to one exemplary embodiment and similar to the selectable option for displaying product scan data described above, a user or operator of PCD 100 may select an option for turning "off" the display of offer data and coupon data matches. According to another exemplary embodiment or the same exemplary embodiment in which the display of offer data and coupon data matches is turned "off", the user or operator of PCD 100 may elect for the transaction controller 1442 automatically apply matches between coupon data 808 and products 130 purchased as well as for matches between the offer data 806 and products 130 purchased. These options or preferences for handling and displaying data may part of a client profile which may be stored in the second storage device 146B. The redeemed coupons may also be sent back through the POS controller 134 to the appropriate electronic redemption used by the merchant. Alternatively, the redeemed coupons may be sent over the first computer communications network 142A to the appropriate electronic redemption used by the merchant as understood by one of ordinary skill in the art.

In block 948, the transaction controller 144 may receive one or more selection(s) of match(es) from the PCD 100 in response to the operator of PCD 100 selecting one or more options displayed in screen 202F of FIG. 2F. In block 951, the transaction controller 144 sends any user selected match(es) over the first computer communication is network 142A and the communication link 103B to the terminal/router emulator 138.

In block 954, the POS controller 134 receives the selected match(es) from the terminal/router emulator 138 and applies the matches against the products 130 listed in the current bill of sale. The process then proceeds to step 957 of FIG. 9C.

Figure 9C:
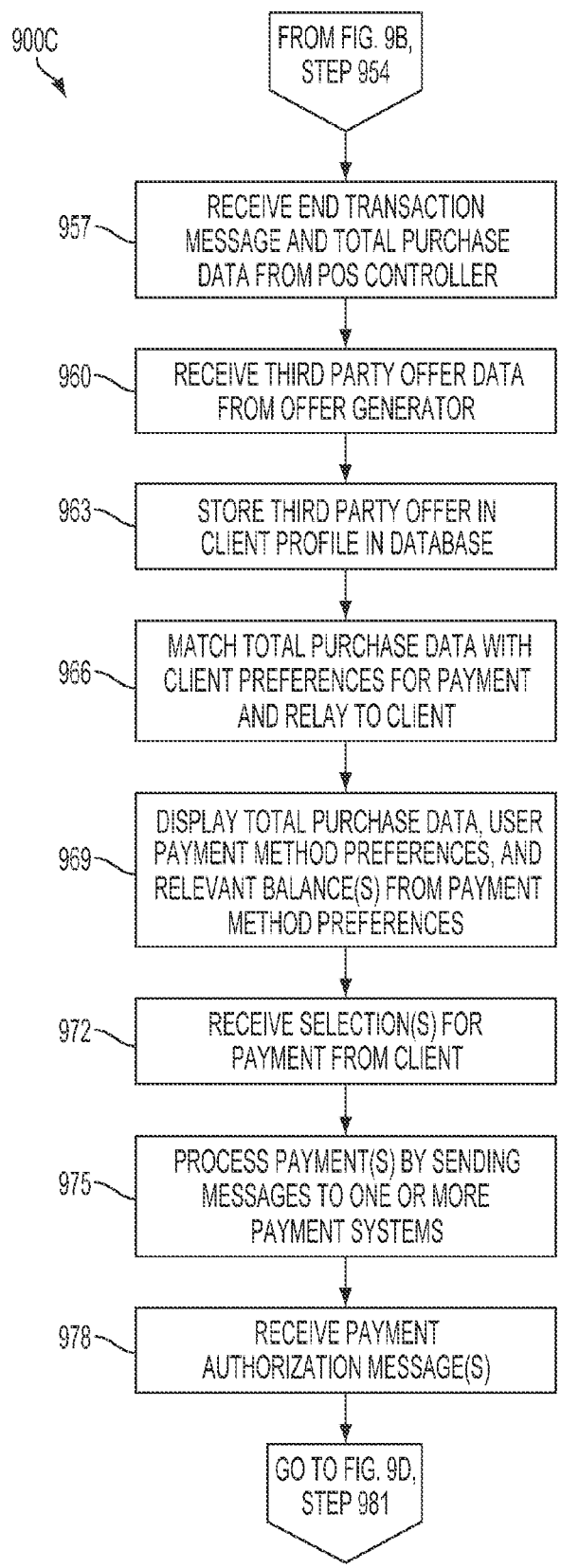

FIG. 9C is a continuation flowchart corresponding to the flowchart of FIG. 9B which illustrates a method 900C for managing transactions with a PCD 100. Block 957 is the first block of this continuation flowchart for managing transactions with the PCD 100. In block 957, the transaction controller 144 may receive end transaction message and total purchase data over the first computer communications network 142A from the POS controller 134. The end transaction message and total purchase data may be generated by the electronic cash register 126 or the product scanner 132 or a combination thereof.

Next, in block 960, the transaction controller 144 may receive third-party offer data produced by the third-party offer generator 140 via the POS controller 134 or through a direct connection between the third-party offer generator 140 as illustrated in FIG. 1. FIG. 1 illustrates to exemplary embodiments in which the third-party offer generator 140 may be coupled directly to the POS controller 134 or the generator 140 may be coupled directly to the transaction controller 144. As described previously, the third-party offer generator 140 may comprise off-the-shelf units, such as, but not limited to, units sold as of this writing by Catalina Marketing, Inc. The offers produced by the generator 140 may comprise coupons targeted for a particular operator of PCD 100 based upon the products 130 that are purchased and recorded by the product scanner 132 and the electronic cash register 126.

In block 963, the transaction controller 144 may take the received third-party offer data and store it in the offer data 804 corresponding to a particular profile of the operator of the PCD 100, as illustrated by the data structure in FIG. 8. Next, in block 966, the transaction controller 144, and specifically the matching engine 518, may match the total purchase data with the client preferences for payment stored in the user preference data 802 as illustrated in the data structure of FIG. 8. The transaction controller 144 may then relayed this client preference for payment methods to the PCD 100.

In block 969, the total purchase data, user payment method references, and relevant balances from the payment method preferences may be displayed on the screen 202G as illustrated in FIG. 2G and generally designated by reference numeral 218A. Next, in block 972, the transaction controller 144 may receive one or more selection(s) for the payment methods over the first computer communications network 142A from the PCD 100 based on selections made by the operator of PCD 100.

Next, in block 975, the transaction controller 144 may process the selected payment methods by sending messages to one or more payment systems. In this block 975, the transaction controller 144 may send messages to the gateway 148 if one or more alternative payment options, such as, but not limited to, PAYPAL™ brand of online financial payment solutions and SPRINT™ brand of mobile telephone networks, have been selected by the user of the PCD 104 paying the final amount due for a purchase. The transaction controller 144 may also send information related to traditional payment methods, such as, but not limited to conventional credit card accounts, stored value accounts, debit account, and checking accounts from the secure vault or first storage device 146A over a secure communication link 103B via the first computer communication is network 142A to the terminal/router emulator 138. In this scenario, the terminal/router emulator 138 functions as a terminal for relaying traditional payment information to the POS controller 134 which in turn takes this traditional payment data and forwards it to its router 136 for processing by conventional payment networks forming the third computer communications network 142C1.

Next in block 978, the transaction controller 144 may receive payment authorizations from any of the alternative payment solutions found in the second computer communication network 142B. Also, in this block 978, the POS controller 134 may receive these authorizations via the router 136 and the third computer communications network 142C1. The process then continues to block 981 of FIG. 9D.

Figure 9D:
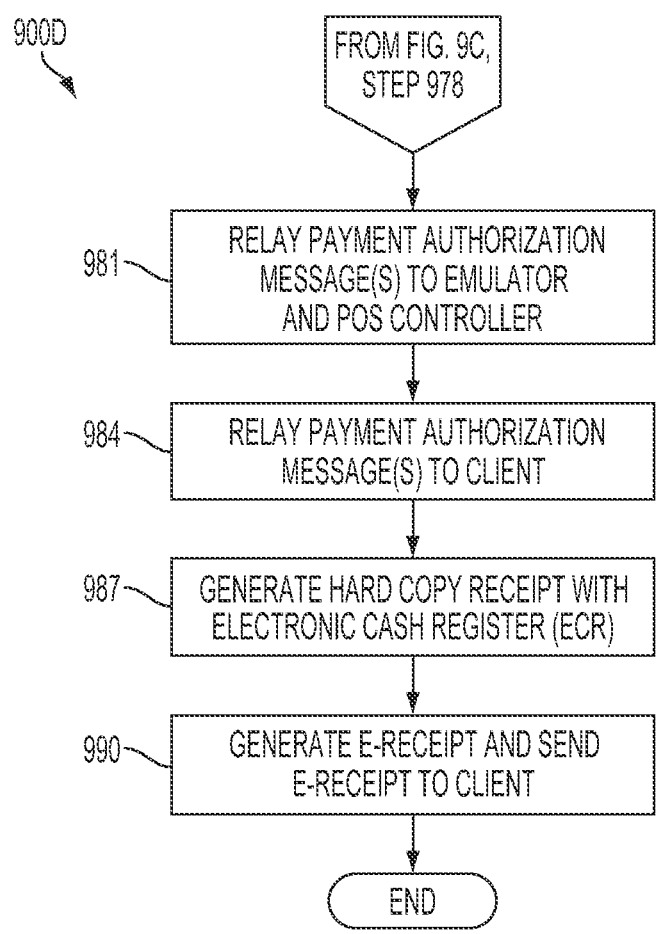

FIG. 9D is a continuation flowchart corresponding to the flowchart of FIG. 9C which illustrates a method 900D for managing transactions with a PCD 100. Block 981 is the first block of this continuation flowchart for managing transactions with the PCD 100. In block 981, the transaction controller 144 may relay the payment authorization messages from the alternative payment sources to the emulator 138 and the POS controller 134. In block 984, the transaction controller 144 may also relay the payment authorization messages from the alternative payment sources as well as the payment authorization messages from the conventional payment sources via the POS controller 134 and router 136 over the first computer communications network 142A to the PCD 100.

Next, in block 987, the electronic cash register 126A may generate a hard copy receipt 127. Similarly, in block 990, the transaction controller 144 may generate an electronic receipt and send it over the computer communications network 142A to the PCD 100 for display on the display device 108 of the PCD 100 as illustrated in screens 202H of FIG. 2H and screen 202K of FIG. 3E. The process then ends.

Figure 10:
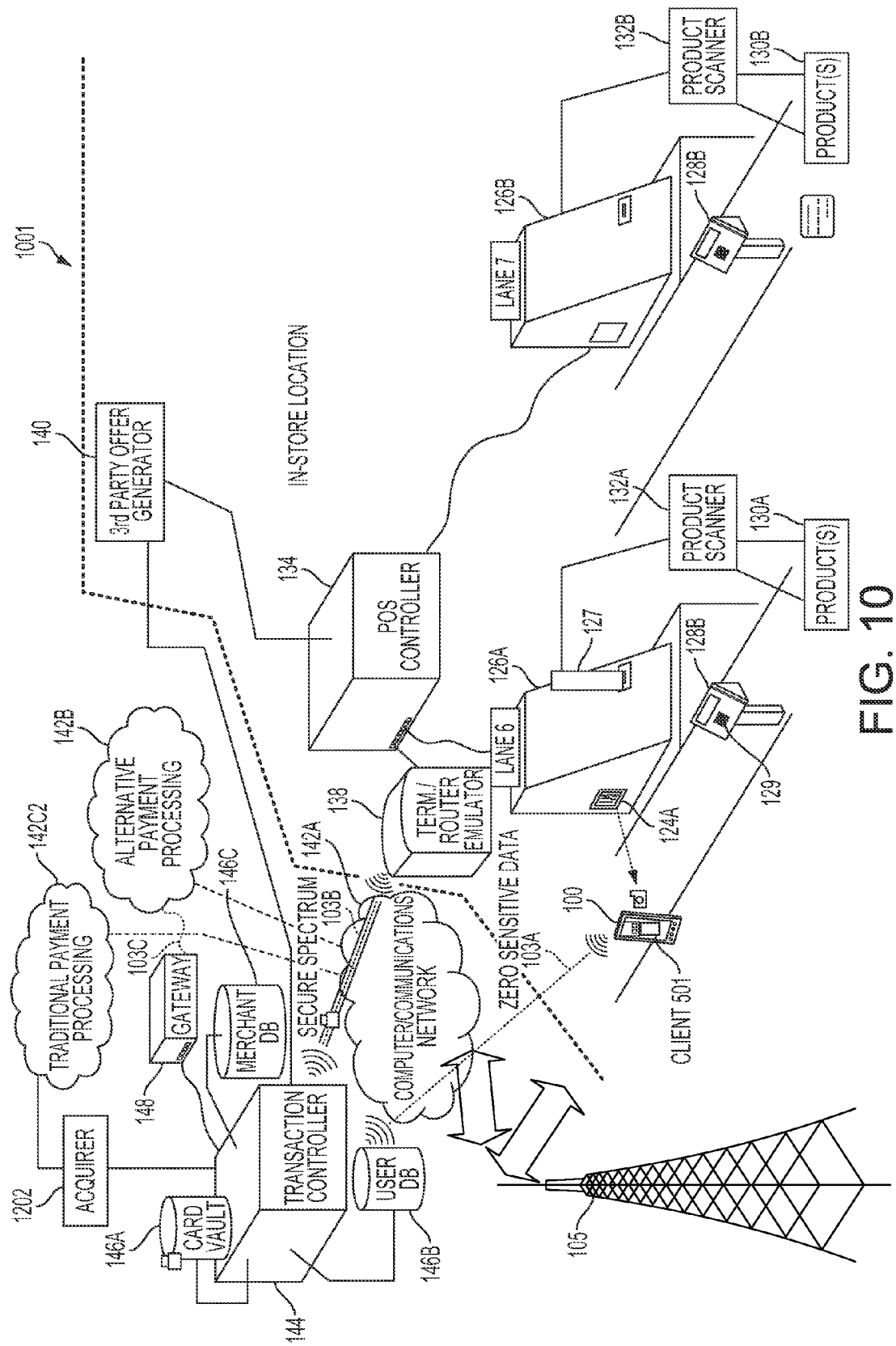
FIG. 10 is a diagram of an alternate exemplary embodiment of a system for managing transactions with the portable computing device.

FIG. 10 is a diagram of an alternate exemplary embodiment of a system 1001 for managing transactions with the portable computing device 100. The system 1001 is very similar to system 101 of FIG. 1. Therefore, only the differences between these two FIG.s will be discussed and described in detail below.

In this exemplary embodiment, the traditional or conventional payment network that comprises the third computer communications network 142C2 is provided adjacent to the transaction controller 144 so that the transaction controller 144 may process conventional payments based on the data which is stored in the secure vault or first database 146A. In other words, compared to FIG. 1, the third computer communications network 142C1 of FIG. 1 has been moved from being coupled to the POS controller 134 to now being coupled to the transaction controller 144 via an optional acquirer system 1202 as understood by one of ordinary skill the art. Therefore, according to the exemplary embodiment of the system 1001 illustrated in FIG. 10, the transactional controller 144 may process any of the traditional payment methods which may include, but are not limited to, credit card accounts stored in the secure vault or first storage device 146A. Meanwhile, as discussed above in connection with FIG. 1, the transactional controller 144 typically relays credit card information through the terminal/router emulator 138 to the POS controller 134 which forwarded this information on to the router 136 and the traditional payment network 142C1. According to the exemplary embodiment illustrated in FIG. 10, a merchant may not be required to pay traditional service fees or be a subscriber of traditional payment networks. Instead, a merchant may interact exclusively with the transactional controller 144 according to this exemplary embodiment for processing all forms of payments available to the operator of the PCD 100.

Figure 11C:
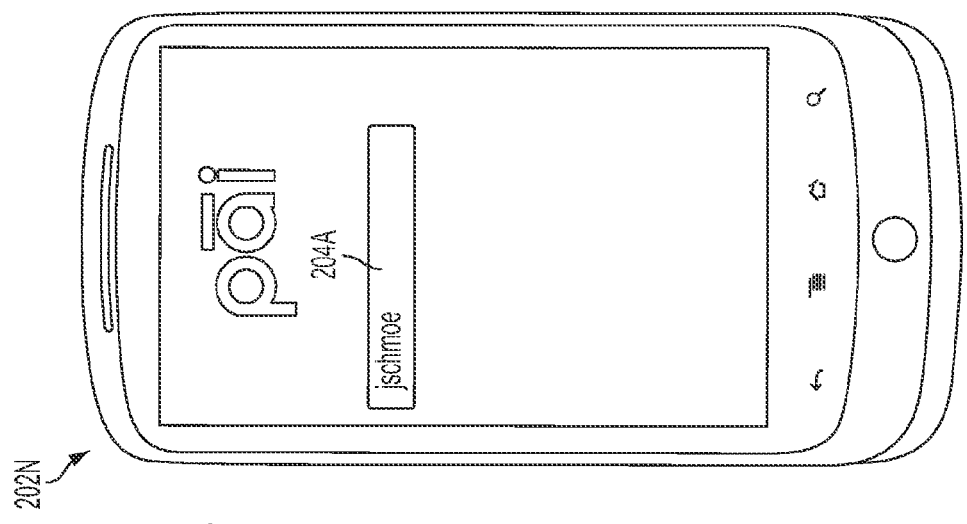
FIG. 11C is a diagram of a screen after a selected log-in credential was selected on the PCD for deletion.
Figure 11B:
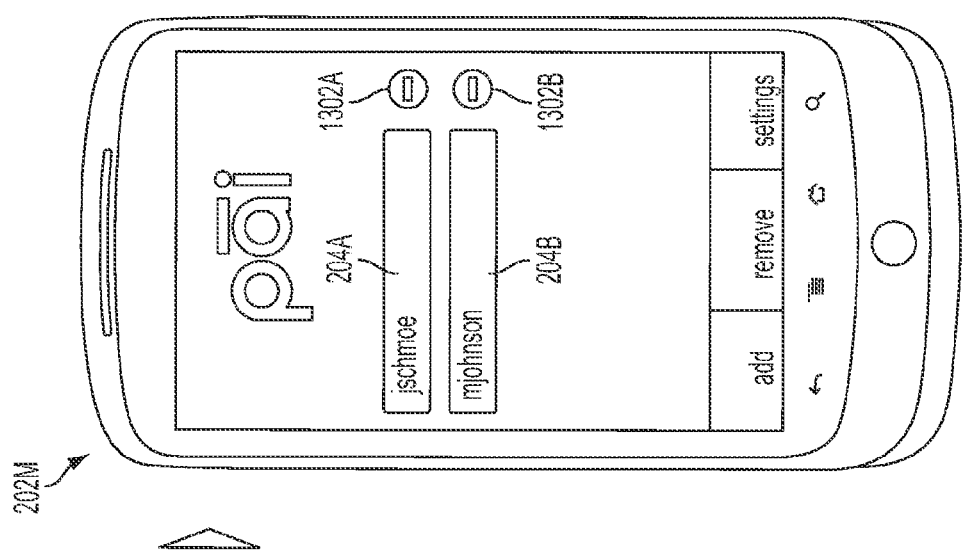
FIG. 11B is a diagram of a screen for selecting one of a plurality of different log-in credentials on the PCD for deletion.
Figure 11A:
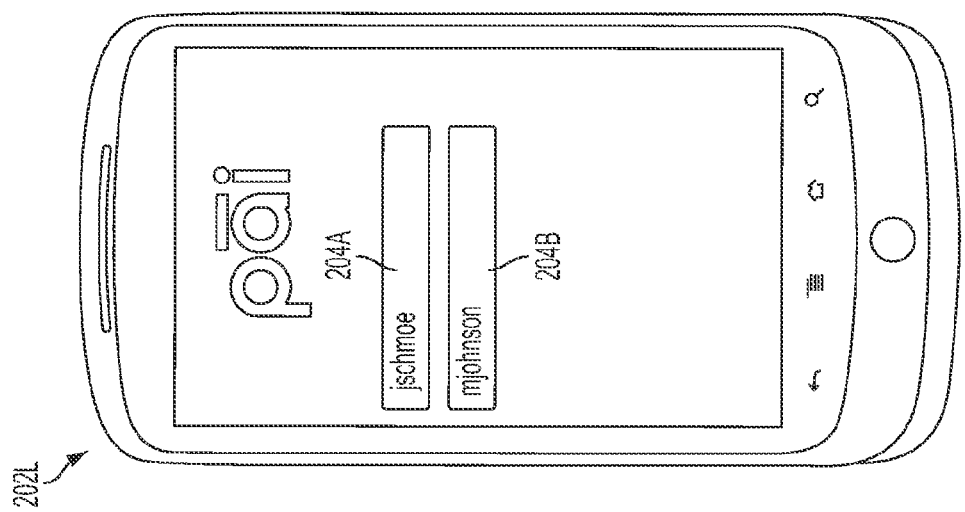
FIG. 11A is a diagram of a screen for selecting different log-in credentials on the PCD to access the system.

FIG. 11A is a diagram of a screen 202L for selecting different log-in credentials on the PCD 100 to access the system 101. This diagram illustrates that the PCD 100, and more specifically the client transaction manager 501 running on the PCD 100 in combination with the transaction controller 144, may support one or more client profiles for a given PCD 100. Screen 202 AL allows the user or operator of the PCD 100 to select from a plurality of profiles designated according to their usernames 204A, 204B.

FIG. 11B is a diagram of a screen 202M for selecting one of a plurality of different log-in credentials on the PCD 100 for deletion. The PCD 100 may support "single click" or "one click" deletion of a profile by displaying profile selector buttons 1302A, 1302B which enable a user or operator of PCD 100 to select a particular profile that is no longer desired for use by the operator of PCD 100.

FIG. 11C is a diagram of a screen 202N after a log-in credential was selected on the PCD 100 for deletion. In the exemplary embodiment illustrated in FIG. 11C, the first client profile corresponding to the first user name 204A remains after the second user name 204B was deleted from the previous screen 202M of FIG. 11B.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example.

Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the Figures which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Alternative embodiments for the method 900 and system 101 for managing transactions with the PCD 100 will become apparent to one of ordinary skill in the art to which the invention pertains without departing from its spirit and scope. For example, the PCD 100 may be used for making purchases in an on-line transaction environment. In such environments, the on-line merchant may provide the merchant identifier and/or terminal identifier on the merchant's website/webpages which may be scanned-in by the PCD 100 or keyed-in by the operator of the PCD 100. The contents of the merchant's on-line shopping cart may then be displayed on the PCD 100 similar to the brick and mortar POS transactions described above. The operator of the PCD 100 may also select preferred payment methods also like the brick and mortar POS transactions described above.

Therefore, although selected aspects have been illustrated and described in detail, it will be understood that various substitutions and alterations may be made therein without departing from the spirit and scope of the present invention, as defined by the following claims.

What is claimed is:

1. A method for managing transactions with a transaction controller and a client portable computing device, the method comprising:
   managing the client portable computing device with the transaction controller;
   verifying by the transaction controller coupled to the client portable device user credentials of a user of the client portable computing device, wherein the credentials are received from the client portable computing device over a computer communications network;
   receiving by the transaction controller a merchant identifier corresponding to a merchant, wherein the merchant identifier is received by the transaction controller from the client portable computing device over the communications network,
   comparing by the transaction controller the merchant identifier against loyalty account data associated with the credentials and stored in a transaction controller database;
   identifying by the transaction controller and sending any matches of the merchant identifier to loyalty account data over the computer communications network to a merchant device associated with the merchant, wherein the merchant device applies at least one of a discount or benefit to a purchase transaction based on the loyalty account data; and
   generating by the transaction controller and transmitting a message to the client portable computing device over the computer communications network that lists one or more preferred payment options that may be selected to complete the modified purchase transaction.

2. The method of claim 1, further comprising: receiving by the transaction controller product scan data from the merchant device and comparing the product scan data against one of offer data and coupon data in a database.

3. The method of claim 2, further comprising: sending by the transaction controller any matches of product scan data to offer data or coupon data over the computer communications network to the merchant device, wherein the merchant device modifies the purchase transaction based on a match of product scan data to offer data or coupon data.

4. The method of claim 1, wherein a preferred payment option is based on user preferences listed in a client profile.

5. The method of claim 1, wherein the preferred payment option comprises account information corresponding to at least one of a credit card account, a debit card account, a checking account, a savings account, and a stored value account.

6. The method of claim 1, further comprising processing by the transaction controller a request to pay for a purchase from a non-traditional payment method comprising one of an on-line financial institution and a mobile phone service carrier.

7. The method of claim 1, wherein the merchant identifier comprises data associated with one of an electronic cash register and a terminal.

8. The method of claim 1, wherein the message that lists one or more preferred payment options is rendered on a display device of the portable computing device.

9. The method of claim 1, further comprising receiving by the transaction controller product scan data from the merchant device and, based on the product scan data, generating one or more offers and storing the offers in a database.

10. The method of claim 1, wherein the client portable computing device comprises at least one of a mobile telephone, a personal digital assistant, a pager, a smartphone, a navigation device, and a hand-held computer with a wireless connection or link.

11. A computer system for managing transactions with a transaction controller and a client portable computing device, the system comprising:
the transaction controller coupled to the client portable device and programmed to:
manage the client portable computing device;
verify user credentials of a user of the client portable computing device, wherein the credentials are received from the client portable computing device;
receive a merchant identifier corresponding to a merchant, wherein the merchant identifier is received by the transaction controller from the client portable computing device;
compare the merchant identifier against loyalty account data associated with the credentials and stored in a transaction controller database;
identify and send any matches of the merchant identifier to loyalty account data to a merchant device associated with the merchant, wherein the merchant device applies at least one of a discount or benefit to a purchase transaction based on the loyalty account data; and
generate and transmit a message to the client portable computing device that lists one or more preferred payment options that may be selected to complete the modified purchase transaction.

12. The system of claim 11, wherein the transaction controller is further programmed to: receive product scan data from the merchant device and compare the product scan data against one of offer data and coupon data in a database.

13. The system of claim 12, wherein the transaction controller is further programmed to: send any matches of product scan data to offer data or coupon data to the merchant device, wherein the merchant device modifies the purchase transaction based on a match of product scan data to offer data or coupon data.

14. The system of claim 11, wherein a preferred payment option is based on user preferences listed in a client profile.

15. The system of claim 11, wherein a preferred payment option comprises account information corresponding to at least one of a credit card account, a debit card account, a checking account, a savings account, and a stored value account.

16. The system of claim 11, wherein the transaction controller is further programmed to: process a request to pay for a purchase from a non-traditional payment method comprising one of an on-line financial institution and a mobile phone service carrier.

17. The system of claim 11, wherein the merchant identifier comprises data associated with one of an electronic cash register and a terminal.

18. The system of claim 11, wherein the message that lists one or more preferred payment options is rendered on a display device of the portable computing device.

19. The system of claim 11, wherein the transaction controller is further programmed to: receive product scan data from the merchant device and, based on the product scan data, generate one or more offers store the offers in a database.

20. The system of claim 11, wherein the client portable computing device comprises at least one of a mobile telephone, a personal digital assistant, a pager, a smartphone, a navigation device, and a hand-held computer with a wireless connection or link.

21. A computer system for managing transactions with a transaction controller and a client portable computing device, the system comprising:
transaction controller means coupled to the client portable computing device for managing the client portable computing device;
transaction controller means coupled to the client portable device for verifying user credentials for gaining access to the transactional controller, wherein the credentials are received from the client portable computing device over a communications network;
transaction controller means coupled to the client portable device for receiving a merchant identifier corresponding to a merchant, wherein the merchant identifier is received by the transaction controller means from the client portable computing device over the communications network;
transaction controller means coupled to the client portable device for comparing the merchant identifier against loyalty account data associated with the credentials and stored in a transaction controller database;
transaction controller means coupled to the client portable device for identifying and sending any matches of the merchant identifier to loyalty account data over the computer communications network to a merchant device associated with the merchant, wherein the merchant device applies at least one of a discount or benefit to a purchase transaction based on the loyalty account data; and
transaction controller means coupled to the client portable device for generating and transmitting a message to the client portable computing device over the communications network that lists one or more preferred payment options that may be selected to complete the modified purchase transaction.

22. The system of claim 21, further comprising: means for receiving product scan data from the merchant device and comparing the product scan data against one of offer data and coupon data in a database.

23. The system of claim 22, further comprising means for sending any matches of product scan data to offer data or coupon data over the computer communications network to the merchant device, wherein the merchant device modifies the purchase transaction based on a match of product scan data to offer data or coupon data.

24. The system of claim 21, wherein a preferred payment option is based on user preferences listed in a client profile.

25. The system of claim 21, wherein a preferred payment option comprises account information corresponding to at least one of a credit card account, a debit card account, a checking account, a savings account, and a stored value account.

26. The method of claim 21, further comprising means for processing a request to pay for a purchase from a non-traditional payment method comprising one of an on-line financial institution and a mobile phone service carrier.

27. The system of claim 21, wherein the merchant identifier comprises data associated with one of an electronic cash register and a terminal.

28. The system of claim 21, wherein the message that lists one or more preferred payment options is rendered on a display device of the portable computing device.

29. The system of claim 21, further comprising: means for receiving product scan data from the merchant device and, based on the product scan data, generating one or more offers and storing the offers in a database.

30. The system of claim 21, wherein the client portable computing device comprises at least one of a mobile telephone, a personal digital assistant, a pager, a smartphone, a navigation device, and a hand-held computer with a wireless connection or link.

31. A computer program product comprising a non-transitory computer usable medium having a computer readable program code embodied therein, said computer readable program code adapted to be executed to implement a method for managing transactions with a transaction controller and a client portable computing device, said method comprising:
   managing the client portable computing device with the transaction controller;
   verifying user credentials for gaining access to a transactional controller coupled to the client portable device, wherein the credentials are received from the client portable computing device over a computer communications network;
   receiving by the transaction controller a merchant identifier corresponding to a merchant, wherein the merchant identifier is received by the transaction controller from the client portable computing device over the communications network;
   comparing by the transaction controller the merchant identifier against loyalty account data associated with the credentials and stored in a transaction controller database;
   identifying by the transaction controller and sending any matches of the merchant identifier to loyalty account data over the computer communications network to a merchant device associated with the merchant, wherein the merchant device applies at least one of a discount or benefit to a purchase transaction based on the loyalty account data; and
   generating by the transaction controller and transmitting a message to the client portable computing device over the communications network that lists one or more preferred payment options that may be selected to complete the modified purchase transaction.

32. The computer program product of claim 31, wherein the program code implementing the method further comprises: receiving product scan data from the merchant device and comparing the product scan data against one of offer data and coupon data in a database.

33. The computer program product of claim 32, wherein the program code implementing the method further comprises: sending any matches of product scan data to offer data or coupon data over the computer communications network to the merchant device, wherein the merchant device modifies the purchase transaction based on a match of product scan data to offer data or coupon data.

34. The computer program product of claim 31, wherein a preferred payment option is based on user preferences listed in a client profile.

35. The computer program product of claim 31, wherein a preferred payment option comprises account information corresponding to at least one of a credit card account, a debit card account, a checking account, a savings account, and a stored value account.

36. The computer program product of claim 31, wherein the program code implementing the method further comprises: processing a request to pay for a purchase from a non-traditional payment method comprising one of an on-line financial institution and a mobile phone service carrier.

37. The computer program product of claim 31, wherein the merchant identifier comprises data associated with one of an electronic cash register and a terminal.

38. The computer program product of claim 31, wherein the message that lists one or more preferred payment options is rendered on a display device of the portable computing device.

39. The computer program product of claim 31, wherein the program code implementing the method further comprises: receiving product scan data from the merchant device and, based on the product scan data, generating one or more offers and storing the offers in a database.

40. The computer program product of claim 31, wherein the client portable computing device comprises at least one of a mobile telephone, a personal digital assistant, a pager, a smartphone, a navigation device, and a hand-held computer with a wireless connection or link.

\* \* \* \* \*